(12) United States Patent
Han et al.

(10) Patent No.: US 10,607,200 B2
(45) Date of Patent: Mar. 31, 2020

(54) POINT OF SALE SYSTEM HAVING A CUSTOMER TERMINAL AND A MERCHANT TERMINAL

(71) Applicant: Square, Inc., San Francisco, CA (US)

(72) Inventors: Koun Han, San Francisco, CA (US); Nicholas Dower, San Francisco, CA (US); Raymond Ryan, San Francisco, CA (US); Bruce Bell, New York, NY (US); Jared Travis Marr, Brooklyn, NY (US); Alexey Kalinichenko, San Francisco, CA (US); Tien Nguyen, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 246 days.

(21) Appl. No.: 15/496,529

(22) Filed: Apr. 25, 2017

(65) Prior Publication Data
US 2018/0150817 A1    May 31, 2018

Related U.S. Application Data

(63) Continuation of application No. 14/981,417, filed on Dec. 28, 2015, now abandoned.

(51) Int. Cl.
*G06Q 20/20* (2012.01)
*G06F 3/0481* (2013.01)
(Continued)

(52) U.S. Cl.
CPC ......... *G06Q 20/202* (2013.01); *G06F 3/0481* (2013.01); *G06F 9/451* (2018.02);
(Continued)

(58) Field of Classification Search
CPC ............... G06Q 20/20; G06Q 30/0268; G06Q 30/0238; G06Q 20/00; G06Q 20/04
See application file for complete search history.

(56) References Cited

U.S. PATENT DOCUMENTS

| 4,150,784 A | 4/1979 | Moorman et al. |
| 5,494,136 A | 2/1996 | Humble |

(Continued)

FOREIGN PATENT DOCUMENTS

| GB | 2 427 059 A | 12/2006 |
| WO | 2013/051032 A1 | 4/2013 |

(Continued)

OTHER PUBLICATIONS

Non-Final Office Action dated Oct. 4, 2018, for U.S. Appl. No. 15/188,711, of Bell, B., et al., filed Jun. 21, 2016.
(Continued)

*Primary Examiner* — Justin S Lee
(74) *Attorney, Agent, or Firm* — Lee & Hayes, P.C.

(57) ABSTRACT

A point of sale system includes a merchant terminal and a customer terminal. The merchant terminal is configured to display a user interface (UI) window on the merchant terminal. The UI window on the merchant terminal displays a merchant-specific version of a screen displayed on the customer terminal. The merchant terminal receives updates from the customer terminal regarding the status of the payment portion for a transaction. The merchant terminal can provide an input to the UI window which is sent as a message to the customer terminal. Control of state for the point of sale system is shared such that when the system is in a first state, the merchant terminal is the state control terminal, and when the point of sale system is in a second state, the customer terminal is the state control terminal and has control of state for the system.

20 Claims, 24 Drawing Sheets

(51) Int. Cl.
*G06F 9/451* (2018.01)
*G07F 7/10* (2006.01)
*G07G 1/01* (2006.01)
*G07F 7/08* (2006.01)
*G07G 1/00* (2006.01)

(52) U.S. Cl.
CPC .......... *G06Q 20/204* (2013.01); *G07F 7/088* (2013.01); *G07F 7/1033* (2013.01); *G07G 1/0018* (2013.01); *G07G 1/01* (2013.01)

(56) References Cited

U.S. PATENT DOCUMENTS

| | | | |
|---|---|---|---|
| 6,098,888 | A | 8/2000 | Praden |
| 6,766,994 | B2 | 7/2004 | Serbinski et al. |
| 7,048,184 | B2 | 5/2006 | Persky |
| 7,370,804 | B2 | 5/2008 | Ishii |
| 7,712,670 | B2 | 5/2010 | Sauerwein, Jr. et al. |
| 8,768,838 | B1 | 7/2014 | Hoffman |
| 9,092,766 | B1 | 7/2015 | Bedier et al. |
| 9,105,026 | B1* | 8/2015 | Edwards ............... G06Q 20/40 |
| 9,286,494 | B1 | 3/2016 | Lamfalusi et al. |
| 9,424,445 | B2 | 8/2016 | Lamfalusi et al. |
| 9,652,641 | B2 | 5/2017 | Lamfalusi et al. |
| 9,767,446 | B2 | 9/2017 | Cooke et al. |
| 2003/0164398 | A1 | 9/2003 | Walker et al. |
| 2004/0034564 | A1 | 2/2004 | Liu |
| 2007/0257110 | A1 | 11/2007 | Schmidt et al. |
| 2008/0016456 | A1 | 1/2008 | Friedland et al. |
| 2009/0006262 | A1 | 1/2009 | Brown et al. |
| 2009/0094126 | A1* | 4/2009 | Killian ............... G06Q 20/0855 705/17 |
| 2009/0259516 | A1* | 10/2009 | Zeevi ............... G06Q 30/02 705/14.65 |
| 2010/0057620 | A1 | 3/2010 | Li et al. |
| 2010/0128047 | A1* | 5/2010 | Makino ............... G09G 5/363 345/581 |
| 2010/0128048 | A1* | 5/2010 | Makino ............... G06F 3/1423 345/581 |
| 2011/0059777 | A1* | 3/2011 | Rao ............... G06F 21/32 455/566 |
| 2011/0321173 | A1 | 12/2011 | Weston et al. |
| 2012/0023026 | A1 | 1/2012 | Chen et al. |
| 2012/0197744 | A1 | 8/2012 | Rose et al. |
| 2012/0254038 | A1 | 10/2012 | Mullen |
| 2012/0290420 | A1 | 11/2012 | Close |
| 2012/0290421 | A1* | 11/2012 | Qawami ............... G06Q 20/20 705/21 |
| 2013/0006847 | A1 | 1/2013 | Hammad et al. |
| 2013/0144731 | A1 | 6/2013 | Baldwin et al. |
| 2013/0282501 | A1 | 10/2013 | Edwards et al. |
| 2013/0299574 | A1 | 11/2013 | Theobald |
| 2014/0022211 | A1 | 1/2014 | Karpin et al. |
| 2014/0047390 | A1 | 2/2014 | Thorsander et al. |
| 2014/0071043 | A1 | 3/2014 | Jung et al. |
| 2014/0095387 | A1 | 4/2014 | Colnot |
| 2014/0249951 | A1* | 9/2014 | Gotanda ............ G06Q 20/0453 705/24 |
| 2015/0019356 | A1* | 1/2015 | Bagdonas .......... G06Q 30/0238 705/21 |
| 2015/0095133 | A1* | 4/2015 | Parker ............... G06Q 20/202 705/14.38 |
| 2015/0185768 | A1* | 7/2015 | Voege ............... G06F 1/166 361/679.3 |
| 2015/0199668 | A1* | 7/2015 | Fernando ............. G06Q 20/203 705/14.65 |
| 2015/0199882 | A1* | 7/2015 | Fernando ............. G07G 1/0018 345/173 |
| 2015/0338917 | A1 | 11/2015 | Steiner et al. |
| 2015/0363757 | A1* | 12/2015 | Mocko ............... G06Q 20/20 705/16 |
| 2016/0063563 | A1* | 3/2016 | Abad Fernandez .................. G06Q 30/0268 705/14.65 |
| 2016/0070964 | A1* | 3/2016 | Conrad ............... G07G 1/0018 348/150 |
| 2016/0117529 | A1 | 4/2016 | Bedier et al. |
| 2016/0117659 | A1 | 4/2016 | Bedier et al. |
| 2016/0117662 | A1 | 4/2016 | Bedier et al. |
| 2016/0124627 | A1* | 5/2016 | Beatty ............... G06F 3/017 705/16 |
| 2016/0125449 | A1* | 5/2016 | Beatty ............... G06Q 30/0238 705/14.38 |
| 2016/0335462 | A1 | 11/2016 | Lamfalusi et al. |
| 2017/0076269 | A1* | 3/2017 | Saeed ............... G06Q 20/3224 |
| 2017/0364888 | A1 | 12/2017 | Bell et al. |
| 2018/0039965 | A1 | 2/2018 | Han et al. |
| 2018/0137491 | A1* | 5/2018 | Sanders ............... G07G 1/0018 |
| 2019/0102764 | A1 | 4/2019 | Pattarawuttiwong |

FOREIGN PATENT DOCUMENTS

| | | |
|---|---|---|
| WO | 2015/001468 A1 | 1/2015 |
| WO | 2015/191468 A1 | 12/2015 |
| WO | 2016/069775 A1 | 5/2016 |
| WO | 2016/081804 A1 | 5/2016 |
| WO | 2017/222696 A1 | 12/2017 |

OTHER PUBLICATIONS

Non-Final Office Action dated Nov. 2, 2018, for U.S. Appl. No. 15/142,966, of Bell, B., et al., filed Apr. 29, 2016.
Notice of Acceptance for Australian Patent Application No. 2015349752, dated Jul. 3, 2017.
International Search Report and Written Opinion for International Application No. PCT/US2017/033370, dated Jul. 21, 2017.
"At a Glance PCI Data Storage, PCI Data Storage Do's and Don'ts," PCI Security Standards Council Llc, dated Dec. 31, 2008, Retrieved from the Internet URL: http://web.archive.org/web/20140704155237/https://www.ocisecuritystandards.org/pdfs/pci_fs_data_storage.pdf, on Feb. 8, 2017, pp. 1-2.
Non-Final Office Action dated Mar. 13, 2015, for U.S. Appl. No. 14/572,692, of Bell, B., et al., filed Dec. 16, 2014.
Non-Final Office Action dated May 21, 2015, for U.S. Appl. No. 14/592,102, of Chen, Y., et al., filed Jan. 8, 2015.
Final Office Action dated Jul. 10, 2015, for U.S. Appl. No. 14/572,692, of Bell, B., et al., filed Dec. 16, 2014.
Non-Final Office Action dated Sep. 16, 2015, for U.S. Appl. No. 14/549,338, of Lamfalusi, M.C., et al., filed Nov. 20, 2014.
Notice of Allowance dated Nov. 10, 2015, for U.S. Appl. No. 14/549,338, of Lamfalusi, M.C., et al., filed Nov. 20, 2014.
Final Office Action dated Dec. 9, 2015, for U.S. Appl. No. 14/592,102, of Chen, Y., et al., filed Jan. 8, 2015.
Non-Final Office Action dated Jan. 14, 2016, for U.S. Appl. No. 14/947,162, of Lamfalusi, M.C., et al., filed Nov. 20, 2015.
Non-Final Office Action dated Mar. 11, 2016, for U.S. Appl. No. 14/572,692, of Bell, B., et al., filed Dec. 16, 2014.
Notice of Allowance dated Mar. 25, 2016, for U.S. Appl. No. 14/947,162, of Lamfalusi, M.C., et al., filed Nov. 20, 2015.
Non-Final Office Action dated Jul. 20, 2016, for U.S. Appl. No. 14/848,123, of Guise, M., et al., filed Sep. 8, 2015.
Non-Final Office Action dated Aug. 25, 2016, for U.S. Appl. No. 15/220,262, of Lamfalusi, M.C., et al., filed Jul. 26, 2016.
Non-Final Office Action dated Aug. 25, 2016, for U.S. Appl. No. 15/221,383, of Lamfalusi, M.C., et al., filed Jul. 27, 2016.
Notice of Allowance dated Jan. 5, 2017, for U.S. Appl. No. 15/220,262, of Lamfalusi, M.C., et al., filed Jul. 26, 2016.
Final Office Action dated Jan. 27, 2017, for U.S. Appl. No. 14/848,123, of Guise, M., et al., filed Sep. 8, 2015.
Notice of Allowance dated Apr. 21, 2017, for U.S. Appl. No. 15/221,383, of Lamfalusi, M.C., et al., filed Jul. 26, 2016.
International Search Report and Written Opinion for PCT Application No. PCT/US2015/051082 dated Dec. 18, 2015.
International Search Report and Written Opinion for PCT Application No. PCT/US2015/051090 dated Dec. 21, 2015.
International Search Report and Written Opinion for PCT Application No. PCT/US2015/061771 dated Jan. 29, 2016.

(56) References Cited

OTHER PUBLICATIONS

International Search Report and Written Opinion for PCT Application No. PCT/US2016/068914 dated Feb. 16, 2017.
Examination Report No. 1 for Australian Patent Application No. 2017245444, dated Dec. 1, 2017.
Final Office Action dated May 17, 2019, for U.S. Appl. No. 15/142,966, of Bell, B., et al., filed Apr. 29, 2016.

* cited by examiner

```
                        ┌─────────────────────────────────────────────┐
                        │ SPECIFY A STATE FOR THE POINT OF SALE       │ ← 600
                        │ SYSTEM HAVING A MERCHANT TERMINAL AND A     │
                        │ CUSTOMER TERMINAL                           │
                        │                   610                       │
                        └────────────────────┬────────────────────────┘
                                             ▼
                        ┌─────────────────────────────────────────────┐
                        │ RENDER A USER INTERFACE (UI) WINDOW ON THE  │
                        │ MERCHANT TERMINAL THAT DISPLAYS A VERSION OF│
                        │ A SCREEN DISPLAYED ON THE CUSTOMER TERMINAL │
                        │                   612                       │
                        └────────────────────┬────────────────────────┘
                                             ▼
                        ┌─────────────────────────────────────────────┐
                        │ SEND UPDATE MESSAGES FROM THE CUSTOMER      │
                        │ TERMINAL TO THE MERCHANT TERMINAL THAT ARE  │
                        │ RELEVANT TO THE STATE OF THE POINT OF SALE  │
                        │ SYSTEM                                      │
                        │                   614                       │
                        └─────────────────────────────────────────────┘
```

FIG. 6

```
                                                                  ← 700
                        ┌─────────────────────────────────────────────┐
                        │ RENDER USER INTERFACE (UI) WINDOW ON A      │
                        │ MERCHANT TERMINAL THAT DISPLAYS A MERCHANT- │
                        │ SPECIFIC VERSION OF A SCREEN DISPLAYED ON A │
                        │ CUSTOMER TERMINAL                           │
                        │                   710                       │
                        └────────────────────┬────────────────────────┘
                                             ▼
                        ┌─────────────────────────────────────────────┐
                        │ RECEIVE A MERCHANT INPUT INTO THE UI WINDOW │
                        │ AND SEND AN INDICATION OF THE MERCHANT INPUT│
                        │ TO THE CUSTOMER TERMINAL                    │
                        │                   712                       │
                        └────────────────────┬────────────────────────┘
                                             ▼
                        ┌─────────────────────────────────────────────┐
                        │ PROCEED AS IF THE MERCHANT INPUT WERE       │
                        │ RECEIVED ON THE CUSTOMER TERMINAL           │
                        │                   714                       │
                        └─────────────────────────────────────────────┘
```

FIG. 7

| 3 Orders | 2 Messages | | | ○ | | 1330 | 9:23 PM 📶 |
|---|---|---|---|---|---|---|---|
| All Items | Luca Brasi | Monte Cristo | Greenpoint Benedict | | | | ⌄ |
| Salads and Soup | Red White and Greenberg | Ricotta Be Kiddin Me | Spectacle 261 | | Tickets | | New Ticket |
| | King Harry Classic | Feel Like Bacon Love | Delboy | | MINE | | |
| Desserts | Hometown Brisket | Hellboy  1322 | Ricky Ricotta | | Bruce Hometown Brisket, Ricotta Be Kiddin Me, Ga... | | 12 min |
| Beverages | Hellified Porkpie White | Anise and Anephew | Cherry Jones | | Jerry Hellboy x 4, The Gates of Eden, Gazpacho, H... | | 8 min |
| Discounts | | Regina | | | Matt Sweet Action x 12 | | 15 min |
| Gift Cards | | Daniela Spinaci | 1320 | | Radric King Harry Classic x 16, Cherry Jones x 4, Gre... | | 2 min |
| Keypad | Greenpointer | A Whiter Shade of Kale | | | ALL | | |
| | | | | | Jared Monte Cristo, Greenpoint Benedict, Luca Bra... | | 14 min |
| | Lacinato Red | | | | Mila A Whiter Shade of Kale, House Red | | 6 min |
| Logout MJ | | | | | Travis | | 10 min |

| 3 Orders | 2 Messages | | | 9:23 PM |
|---|---|---|---|---|
| All Items | | | | ↗ 1410 |

| | | | |
|---|---|---|---|
| Salads and Soup | Luca Brasi | Monte Cristo | Greenpoint Benedict |
| | Red White and Greenberg | Ricotta Be Kiddin Me | Spectacle 261 |
| | King Harry Classic | Feel Like Bacon Love | Delboy |
| Desserts | Hometown Brisket | Hellboy | Ricky Ricotta |
| Beverages | Hellified Porkpie White | Anise and Anephew | Cherry Jones |
| Discounts | | | |
| Gift Cards | Brian DeParma | Regina | |
| Keypad | Greenpointer | Daniela Spinaci | 1320 |
| | Lacinato Red | A Whiter Shade of Kale | |

Current Sale

| | |
|---|---|
| Sweet Action x 2 | $10.00 |
| The Gates of Eden Chicken $4.00 No Cheese | $14.00 |
| Gazpacho | $8.00 |
| Hellboy | $17.00 |
| Greenpointer Prosciutto di Parma $3.00 | $18.00 |
| Tax | $6.70 |

| $74 | $75 | $80 | $100 |
|---|---|---|---|

Save    $73.70 ↙ 1420

Logout MJ

FIG. 14

| | | | | 9:23 PM 📶 |
|---|---|---|---|---|
| 3 Orders | 2 Messages | | | |
| All Items | Luca Brasi | Monte Cristo | Greenpoint Benedict | × $73.70  1522  1524  Split |
| Salads and Soup | Red White and Greenberg | Ricotta Be Kiddin Me | Spectacle 261 | CASH  $74  $75  $80  $100 |
| Pizza | King Harry Classic | Feel Like Bacon Love | Delboy | Custom Amount |
| Desserts | Hometown Brisket | Hellboy | Ricky Ricotta | CARD  Enter Card Number  1526 |
| Beverages | Hellified Porkpie White | Anise and Anephew | Cherry Jones | OTHER  Other Payment Method  1528 |
| Discounts | | | | |
| Gift Cards | Brian DeParma | Regina | | 5 NEARBY  Bruce  1530 |
| Keypad | Greenpointer | Daniela Spinaci | 1320 | |
| | Lacinato Red | A Whiter Shade of Kale | | Mikael  1532 |
| Logout MJ | | | | ↑ 1520 |

| 3 Orders | 2 Messages | | | — | Amex 1234 — 1610 |
|---|---|---|---|---|---|
| All Items | Luca Brasi | Monte Cristo | Greenpoint Benedict | Tickets | > |
| Salads and Soup | Red White and Greenberg | Ricotta Be Kiddin Me | Spectacle 261 | IN PROGRESS | New Ticket — 1630 |
| Pizza | King Harry Classic | Feel Like Bacon Love | Delboy | Current Sale — 1640 Ricky Ricotta, Coke x 2, Beans and Rice, Cor... MINE | |
| Desserts | Hometown Brisket | Hellboy | Ricky Ricotta | Bruce Hometown Brisket, Ricotta Be Kiddin Me, Ga... | 12 min |
| Beverages | Hellified Porkpie White | Anise and Anephew | Cherry Jones | Jerry Hellboy x 4, The Gates of Eden, Gazpacho, H... | 8 min |
| Discounts | | | | Matt Sweet Action x 12 | 15 min |
| Gift Cards | Brian DeParma | Regina | | Radric King Harry Classic x 16, Cherry Jones x 4, Gre... | 2 min |
| Keypad | Greenpointer | Daniela Spinaci | 1320 | ALL | |
| | Lacinato Red | A Whiter Shade of Kale | | Jared Monte Cristo, Greenpoint Benedict, Luca Bra... | 14 min |
| Logout MJ | | | | | |

FIG. 16

| 3 Orders | 2 Messages | | | |
|---|---|---|---|---|
| All Items | Luca Brasi | Monte Cristo | Greenpoint Benedict | Tickets |
| Salads and Soup | Red White and Greenberg | Ricotta Be Kiddin Me | Spectacle 261 | New Ticket ← 1620 |
| Pizza | King Harry Classic | Feel Like Bacon Love | Delboy | IN PROGRESS ← 1630 |
| Desserts | Hometown Brisket | Hellboy | Ricky Ricotta | Current Sale ← 1640 Ricky Ricotta, Coke x 2, Beans and Rice, Cor... MINE |
| Beverages | Hellified Porkpie White | Anise and Anephew | Cherry Jones | Bruce 12 min Hometown Brisket, Ricotta Be Kiddin Me, Ga... |
| Discounts | | | | Je He Waiting for Customer to Perform Ma Payment Sw Ra |
| Gift Cards | Brian DeParma | Regina | 1320 | King Harry Classic x 16, Cherry Jones x 4, Gre... ALL |
| Keypad | Greenpointer | Daniela Spinaci | | Jared 14 min Monte Cristo, Greenpoint Benedict, Luca Bra... |
| Logout MJ | Lacinato Red | A Whiter Shade of Kale | | |

↑ 1610  Amex 1234

| 3 Orders | 2 Messages | | | Choosing Account — 1710, 1720 |
|---|---|---|---|---|
| All Items | Luca Brasi | Monte Cristo | Greenpoint Benedict | Tickets |
| Salads and Soup | Red White and Greenberg | Ricotta Be Kiddin Me | Spectacle 261 | New Ticket — 1730 |
| Pizza | King Harry Classic | Feel Like Bacon Love | Delboy | IN PROGRESS |
| Desserts | Hometown Brisket | Hellboy | Ricky Ricotta | Current Sale |
| | | | | Ricky Ricotta, Coke x 2, Beans and Rice, Cor... |
| | | | | MINE |
| Beverages | Hellified Porkpie White | Anise and Anephew | Cherry Jones | Bruce 12 min |
| | | | | Hometown Brisket, Ricotta Be Kiddin Me, Ga... |
| Discounts | | Regina | | Jerry 8 min |
| | | | | Hellboy x 4, The Gates of Eden, Gazpacho, H... |
| Gift Cards | Brian DeParma | Daniela Spinaci | 1320 | Matt 15 min |
| | | | | Sweet Action x 12 |
| Keypad | Greenpointer | | | Radric 2 min |
| | | | | King Harry Classic x 16, Cherry Jones x 4, Gre... |
| | | | | ALL |
| Logout MJ | Lacinato Red | A Whiter Shade of Kale | | Jared 14 min |
| | | | | Monte Cristo, Greenpoint Benedict, Luca Bra... |

FIG. 17

POINT OF SALE SYSTEM HAVING A CUSTOMER TERMINAL AND A MERCHANT TERMINAL

RELATED APPLICATIONS

This application claims priority to and is a continuation of U.S. patent application Ser. No. 14/981,417, filed on Dec. 28, 2015, the entire contents of which are incorporated herein by reference.

BACKGROUND

Customers can interact with merchants to conduct various transactions. For example, a customer can conduct a transaction with a merchant at a point of sale system using cash, a transaction card, or other transaction instrument. Many transactions require that the customer sign a physical receipt, electronically approve a transaction, e.g., by pressing an approve button on a user interface, electronically sign for the transaction, e.g., with a stylus or finger on an electronic signature capture device with a touch sensitive pad, or enter an authorizing personal identification number (PIN), many of which techniques require additional transaction electronics and time.

Many point of sale systems provide a merchant display, or other interface, for a merchant and a customer display or interface for a customer. In general, the customer display is not visible to the merchant and the customers must guide themselves through the transaction utilizing the customer display or customer interface.

BRIEF DESCRIPTION OF THE DRAWINGS

The disclosure below refers to the accompanying drawings, which are provided for the purpose of illustration only to depict example embodiments of the disclosure and are not therefore to be considered to be limiting of its scope. The principles herein are described and explained with additional specificity through the accompanying drawings in which:

FIG. 6 illustrates an example diagram of flow of data for communicating between a merchant terminal and a customer terminal in a point of sale transaction, where a user interface (UI) window is rendered on a merchant terminal and update messages are sent from the customer terminal to the merchant terminal.

FIG. 7 illustrates an example diagram of flow of data for communicating between a merchant terminal and a customer terminal in a point of sale transaction, where a merchant input is received on a UI window of the merchant terminal, and the point of sale system proceeds as if the merchant input were received on the merchant terminal.

FIG. 13 illustrates an example view of a merchant facing terminal of a point of sale system displaying a merchant graphical user interface (GUI) in a "null" or ready state, in accordance with some embodiments.

FIG. 14 illustrates an example view of a merchant facing terminal of a point of sale system displaying a merchant GUI after a merchant has selected an item to input for a first point of sale transaction, in accordance with some embodiments.

FIG. 15 illustrates an example view of a merchant facing terminal displaying a merchant GUI showing payment options, in accordance with some embodiments.

FIG. 16 illustrates an example view of a merchant facing terminal and displaying a merchant GUI including options available to a merchant once the item input portion of the first point of sale transaction is complete and control of state of the first point of sale transaction is transferred to the customer facing terminal, in accordance with some embodiments.

FIG. 16A illustrates an example view of a merchant facing terminal and further displaying a merchant UI window overlaid on the merchant GUI of the point of sale system.

FIG. 17 illustrates an example view of a merchant facing terminal displaying a merchant GUI for a merchant to initiate a second point of sale transaction, in accordance with some embodiments.

DETAILED DESCRIPTION

Figure 1:
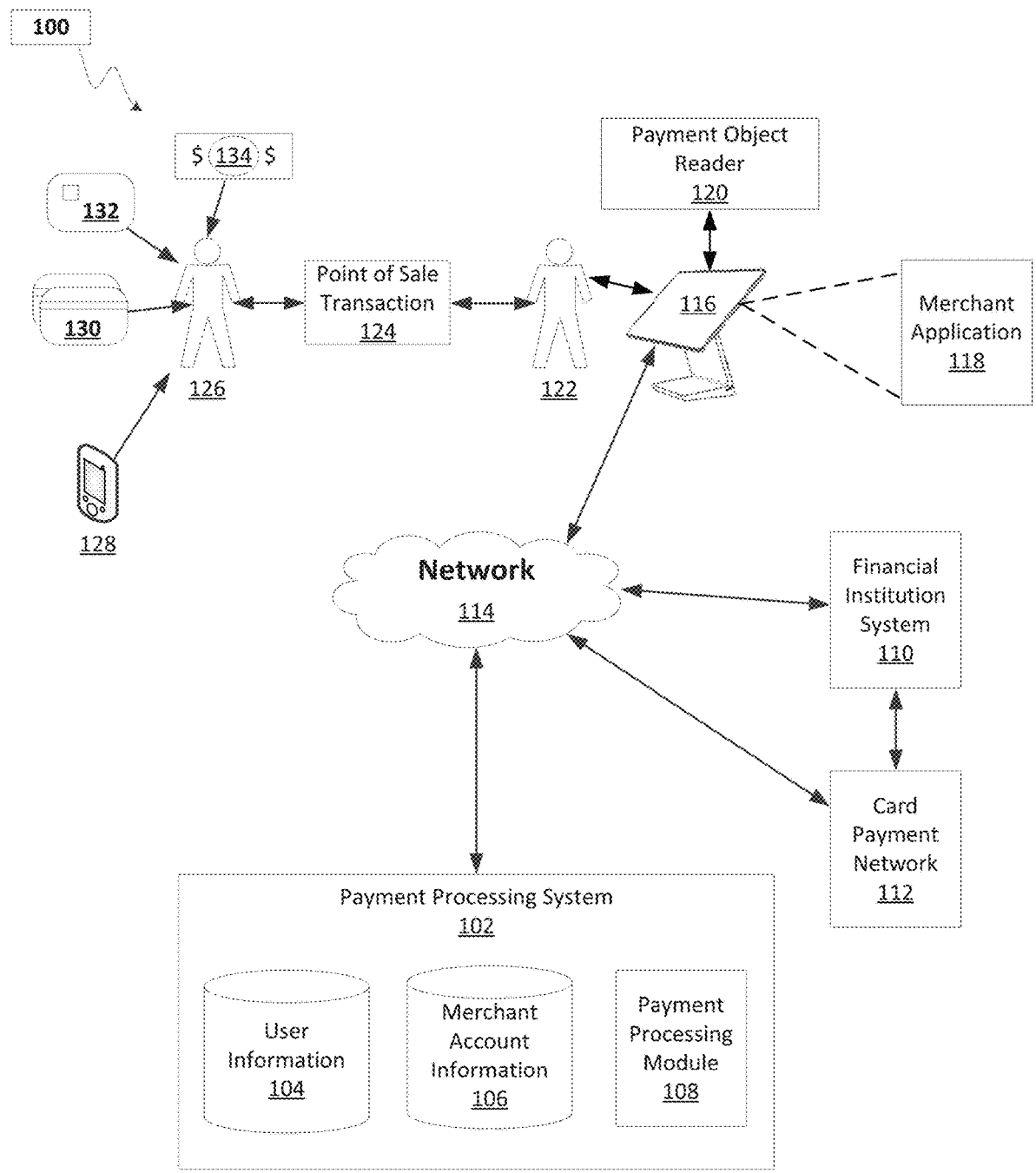
FIG. 1 illustrates an example architecture of a payment communication system for enabling transactions between merchants and buyers.

Systems, devices, methods, and non-transitory computer-readable media disclosed in accordance with various embodiments of the present disclosure overcome one or more of the above-referenced and other deficiencies in conventional approaches to point of sale systems. In particular, in accordance with various embodiments, approaches provide for a point of sale system that is used in performing a payment transaction at a point of sale system.

A point of sale system includes a merchant terminal configured to guide a merchant through a series of merchant steps in a point of sale transaction, and a customer terminal configured to guide a customer through a series of customer steps in the point of sale transaction.

The merchant interface of the point of sale system can be configured to display a user interface (UI) window including a version of a screen displayed on the customer terminal so that the merchant is able to view the merchant point of sale interface as well as the version of the screen displayed on the customer terminal in the UI window on the merchant terminal. The point of sale system can include memory that stores instructions that cause the point of sale system to specify a state for the point of sale system, render the UI window on the merchant terminal for the specified state and cause the customer terminal to send update message to the merchant terminal that are relevant to the specified state.

The point of sale system includes memory that stores instructions that when executed cause the point of sale system to render the merchant UI window on the merchant terminal, receive a merchant input interacting with one of at least some UI features in the merchant UI window, and cause both the merchant terminal and the customer terminal to proceed with the point of sale transaction as if the received input at the merchant terminal were received on the customer terminal.

The point of sale system includes memory that stores instructions that when executed cause the point of sale system to determine which one of the merchant terminal and the customer terminal has control of a state of the point of sale system. The terminal having control is designated the state control terminal and the terminal not having control is designated as the non-state control terminal. The instructions are configured to send a communication from the state control terminal to the non-state control terminal. The communication can specify the state of the point of sale system and a UI element that is to be interpreted and rendered by the non-state control terminal. The state control terminal then receives update messages from the non-state control terminal. The update messages are descriptive of interactions with the UI element rendered by the non-state control terminal. The update messages can include a specified number of messages that are considered acceptable in the specified state.

As used herein, unless otherwise noted, the term "UI window" or "merchant UI window" refers to the UI window that is displayed on the merchant terminal and that represents a version of the screen that is displayed on the customer terminal. In some embodiments, the UI window can display the same screen as displayed on the customer terminal. The UI window can be a separate window displayed on the merchant user interface of the merchant terminal, or can be displayed as an overlay on the merchant user interface of the merchant terminal.

The point of sale system can implement a protocol for communicating between the merchant terminal and the customer terminal. The protocol can be implemented as hardware, software, or a combination thereof. The protocol determines which one of the merchant terminal and the customer terminal has control of the state of the point of sale system, to designate the terminal having control as the state control terminal, and designate the terminal not having control as the non-state control terminal. During a transaction, there are multiple states for the point of sale system, and in each state (for example, a first state, a second state, a third state, etc.), one of the merchant terminal or the customer terminal is in control of the state. The state can be designated by the status of the point of sale transaction. For example, during a PIN entry of a transaction, a corresponding PIN entry state can designate the customer terminal as having control of the state.

A communication is sent from the state control to the non-state control terminal, specifying the state of the point of sale system and a UI element that is to be interpreted and rendered by the non-state control terminal. For example, if the state control terminal is the merchant terminal, the merchant terminal can specify the state of the point of sale system and a UI element that is to be interpreted and rendered by the customer terminal. Likewise, if the state control terminal is the customer terminal, the merchant terminal can specify the state of the point of sale system and a UI element that is to be interpreted and rendered by the merchant terminal. The state control terminal then receives update messages from the non-state control terminal. The update messages are descriptive of interactions with the UI elements rendered by the non-state control terminal. The update messages can specify a limited number of messages that are considered acceptable in the specified state.

Other advantages, variations, and functions are described and suggested below as can be provided in accordance with the various embodiments.

FIG. 1 illustrates an example architecture of a payment communication system 100 for enabling point of sale (POS) transactions between merchants 122 and buyers 126. In the example of FIG. 1, a buyer 126 can use any of a variety of payment objects, such as payment cards 130, 132 or cash 134 when participating in a POS transaction 124 with a merchant 122. A buyer 126 can typically have payment cards 130, 132 such as credit cards, debit cards, prepaid cards, and the like, that the buyer 126 can use for conducting a POS transaction 124. In some embodiments, the payment cards 130 can include one or more magnetic stripes for providing payment object and buyer information when swiped in a payment object reader 120 communicatively coupled to a merchant device 116. In some embodiments, other types of payment objects can be used, for example smart cards 132 having a built in integrated circuit including a memory chip (e.g., EMV payment objects), a radio frequency identification tag (e.g., near field communication (NFC) enabled objects), and the like. In some embodiments, the user 126 can use the user device 128 to conduct NFC payment transactions through communication between the user device 128 and the payment object reader device 120, for example. In some embodiments, the user device 128 can be replaced with a customer terminal coupled to the merchant terminal 116, which can for example be the point of sale system 700 shown in FIGS. 7-10, and in particular the merchant terminal 710 and the customer terminal 810 in some embodiments. In some embodiments, the user device 128 can be used to interact with a customer terminal (for example customer terminal 810) to perform certain transactions, such as a transaction using an NFC enabled device of the customer.

The payment communication system 100 in the example of FIG. 1 illustrates a merchant point of sale device 116 associated with the merchant 122 that participates in the payment service provided by the service provider of the payment processing system 102. The merchant device 116 can be a computing device (e.g., a mobile computing device) able to communicate with the payment processing system 102, and with various other computing devices, through suitable communication protocols, interfaces, and networks, including network 114. Further, the merchant device 116 can be any appropriate device operable to send and receive requests, messages, or other types of information over the network 114. Additionally, while only a single merchant device 116 is illustrated in the example of FIG. 1, in some embodiments there can be additional merchant devices depending on the number of merchants participating in the payment service, or a plurality of components arranged as a POS system. Refer to FIGS. 7-10 for example point of sale systems including a merchant terminal 710 and a customer terminal 810.

Each merchant device 116 can include an instance of a merchant application 118 executed on the merchant device. The merchant application 118 can provide POS functionality to enable the merchant 122 to accept payments at a POS location using the merchant device 116. In some types of businesses, the POS location can correspond to a store or other place of business of the merchant, and thus, can be a fixed location that typically does not change on a day-to-day basis. In other types of businesses, however, the POS location can change from time to time, such as in the case that the merchant 122 operates a food truck, is a street vendor, a cab driver, or has an otherwise mobile business, e.g., in the case of merchants who sell items at buyers' homes, buyers' places of business, and so forth.

The merchant device 116 is communicatively coupled to a payment object reader 120, either by direct connection, for example through an audio jack of the mobile phone connected to an audio plug of the payment object reader, or through wireless connection, such as WiFi, BlueTooth, BLE (Bluetooth low energy), NFC, or other appropriate short-range communication. The payment object reader can read data from a magnetic stripe card or an EMV chip-type card and communicate the data to the mobile phone. The payment object reader can also read data from an NFC device and communicate the data to the merchant device 116. The payment object reader is shown as being coupled to the merchant device 116, however in some embodiments, the payment object reader can be integral with the merchant device 116.

Accordingly, the merchant 122 and the buyer 126 can conduct a POS transaction 124 by which the buyer 126 acquires an item or service from the merchant 122 at a POS location. The merchant application 118 on the merchant device 116 can send transaction information to the payment processing system 102, e.g., as the transaction is being conducted at the POS location. In some embodiments, such as if a particular merchant device 116 is not connected to the network 114 and is therefore processing transactions offline, the transaction information can be sent in a batch at a subsequent point in time or using other suitable techniques. In some embodiments, the transaction information can be sent via SMS, MMS, or a voice call.

In some embodiments, the payment processing system 102 is configured to send and receive data to and from the user device and the merchant device. For example, the payment system can be configured to send data describing merchants to the user device using, for example, the information stored in the merchant account information database 106. The data describing merchants can include, for example, a merchant name, geographic location, contact information, and an electronic catalogue, e.g., a menu that describes items that are available for purchase from the merchant.

In some embodiments, the payment system can also be configured to communicate with a computer system of a card payment network 112, e.g., Visa or MasterCard, etc., over the network, or over a different network, for example, to conduct electronic financial transactions. The computer system of the card payment network can communicate with a computer system of a financial institution system 110, e.g., a bank. There can be computer systems of other entities, e.g., the card acquirer, between the payment system and the computer system of the card issuer.

The payment system can then communicate with the computer system of a card payment network 112 to complete an electronic financial transaction for the total amount to be billed to the customer's financial account. Once the electronic financial transaction is complete, the payment system can communicate data describing the card-less payment transaction to the user device, e.g., an electronic receipt, which can, for example, notify the customer of the total amount billed to the user for the card-less payment transaction with the particular merchant.

To accept electronic payments using the POS system 100, the merchant 122 typically creates a merchant account with the payment processing system 102 by providing information describing the merchant including, for example, merchant name, contact information (e.g., telephone numbers, the merchant's address, and one or more financial accounts to which funds collected from buyers will be deposited). This merchant information can be securely stored by the payment processing system, for example, as merchant account information 106 in a secure database. Further, the merchant information can include a merchant profile created for each merchant. The merchant profile can include information about the merchant 122 and transaction information associated with transactions conducted by the merchant. User information 104 can likewise be securely stored by the payment processing system 102 for the customers to enable customers to conduct various financial transactions.

The payment processing system 102 provides a payment service in which merchants 122 are able to conduct POS transactions 124 with a plurality of buyers 126, such as for selling services and/or products to the buyers 126. The payment processing system 102 can include one or more servers that are configured to process secure electronic financial transactions, e.g., payment during a POS transaction 124, by communicating with the merchant device 116, card payment networks 112, and bank or other financial institution payment systems 110. The payment processing system 102 includes a payment processing module 108 that receives transaction information for processing payments made through the merchant application 118. For example, the payment processing module 108 can receive transaction information, such as an amount of the transaction, and can verify that a particular payment card 130, 132 can be used to pay for the transaction, such as by contacting a card clearinghouse of a card payment network 112. Furthermore, in some examples, the payment processing module 108 can redirect payment information for transactions to be made using payment cards 130, 132 to a bank, or other financial institution, payment system 110. In other embodiments, the merchant device 116 can communicate directly with an appropriate card payment network 112 or bank payment system 110 for approving or denying a transaction using a particular payment card 130, 132 for a POS transaction 124.

As introduced above, the payment processing system 102 can be configured to communicate with one or more systems of a card payment network (e.g., MasterCard®, VISA®, or the like) over the network to conduct financial transactions electronically. The payment processing system 102 can also communicate with one or more bank payment systems of one or more banks over the network. For example, the payment processing system 102 can communicate with an acquiring bank, a payment card issuing bank, and/or a bank maintaining buyer accounts for electronic payments.

A payment card acquiring bank can be a registered member of a card association (e.g., Visa®, MasterCard®, or the like), and can be part of a card payment network A payment card issuing bank can issue payment cards to buyers, and can pay acquiring banks for purchases made by cardholders to which the issuing bank has issued a payment card. Accordingly, in some embodiments, the systems of an acquiring bank can be included in the card payment network and can communicate with systems of a payment card issuing bank to obtain payment. Further, in some embodiments, bank payment systems can include systems associated with debit card issuing institutions, in which case, the systems of the debit card issuing institution can receive communications regarding a transaction in which the buyer uses a debit card instead of a credit card. Additionally, there can be systems of other financial institutions involved in some types of transactions or in alternative system architectures and thus, the foregoing are merely several examples.

The network 114 can be a conventional type, wired or wireless, and can have numerous different configurations including a star configuration, token ring configuration, or other configurations. Furthermore, the network 114 can include an intranet, a local area network (LAN), a wide area network (WAN) (e.g., the Internet), and/or other interconnected data paths across which multiple devices can communicate. In some embodiments, the network 114 can be a peer-to-peer network. The network 114 can also be coupled with or include portions of a telecommunications network for sending data using a variety of different communication protocols. In some embodiments, the network 114 can include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 1 illustrates one network 114 coupled to the merchant device, payment processing system, card payment network, and bank, more than one network 114 can connect these entities. The payment system, the merchant device, and the user device can communicate over the network using wired or wireless connections, or combinations thereof.

Figure 2:
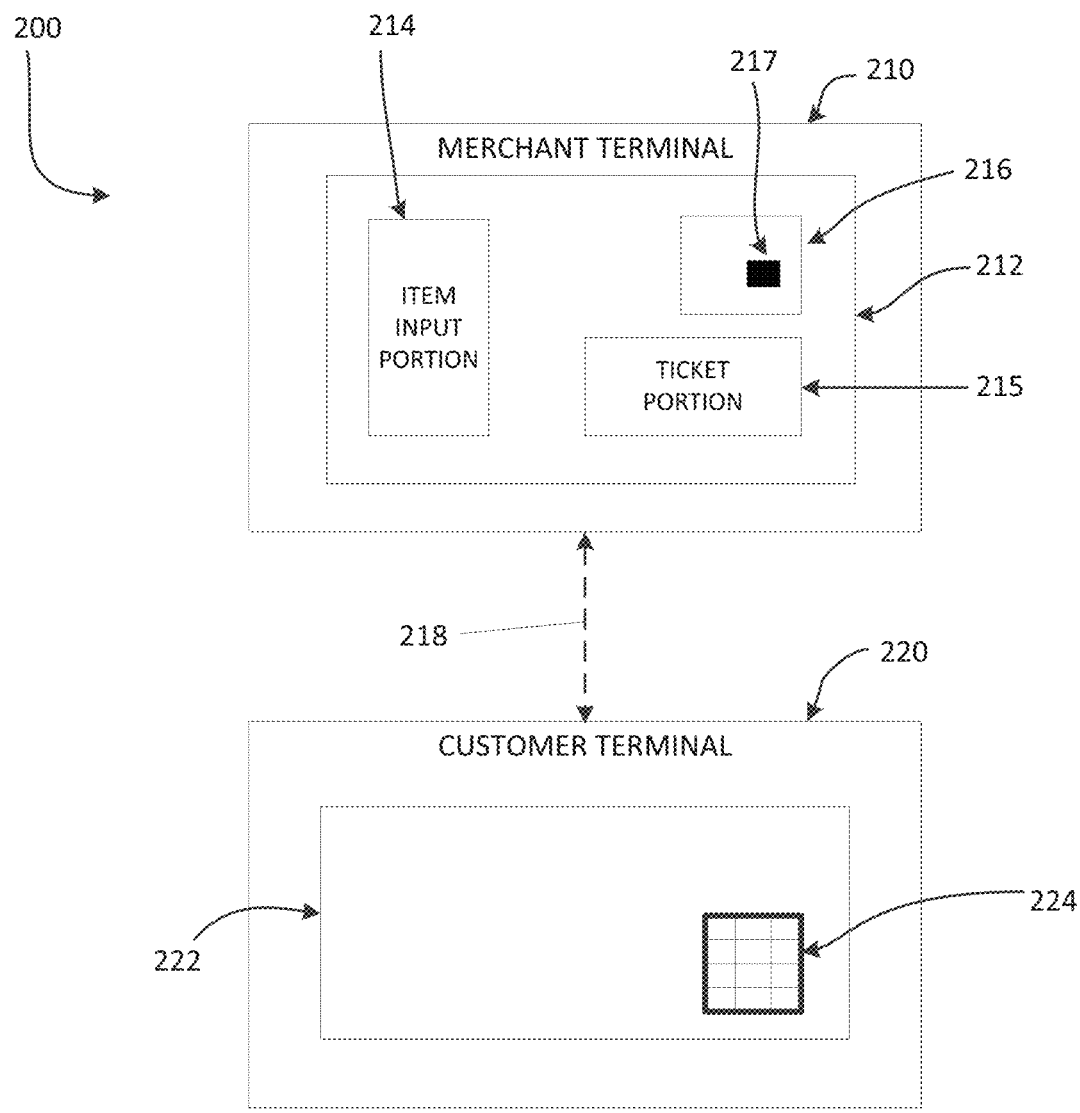
FIG. 2 illustrates an example diagram showing a merchant terminal and a customer terminal used in a point of sale system.

Reference is now made to FIG. 2 illustrating an example diagram of a point of sale system having a customer terminal and a merchant terminal. In accordance with various embodiments, an example point of sale system 200 includes a merchant terminal 210 and a customer terminal 220. The merchant terminal 210 is configured to present a merchant point of sale interface 212 to a merchant. The merchant point of sale interface 212 can present a series of screens to a merchant to guide the merchant through a point of sale transaction. The merchant point of sale interface 212 includes an item input portion 214 that allows the merchant to input items that a customer is requesting. The items can be added to an order, ticket, cart, or other itemized list of items. The merchant point of sale interface 212 includes a ticket portion 215 that can display a plurality of tickets that are being processed at the merchant location. The merchant can be, for example, a restaurant, a store, or another point of sale location. The merchant point of sale interface can also display a user interface (UI) window 216. The UI window 216 displays a merchant-specific version of the screen (e.g., customer interface 222) that is displayed on the customer terminal 220. The merchant terminal 210 and the customer terminal 220 can communicate with each other via channel 218, which can be a direct hard wiring through appropriate connecting cables and plugs, such as a USB or mini-USB or micro-USB, or a wireless communication, such as WiFi, Bluetooth, Bluetooth Low Energy (BLE), and other short-range or long-range communications.

The customer terminal 220 is configured to present a customer point of sale interface 222 to a customer during a point of sale transaction. A customer can interact with the customer point of sale interface 222 on the customer terminal to perform a payment portion of a point of sale transaction for a particular ticket. The customer point of sale interface 222, in at least one screen, can include a Personal Identification Number (PIN) pad window 224 that displays a PIN pad for allowing a customer to enter their pin data. The position, shape, size and orientation of the PIN pad 224 is variable within ordinary skill depending upon the point of sale system. The UI window 216 on the merchant point of sale interface 212 includes the merchant-specific version of the screen on the customer terminal, and as shown in FIG. 2, the UI window 216 can include a merchant-specific version of the PIN pad window 224, represented as a merchant-specific PIN pad window 217 in the point of sale interface 212. The UI window 216 can also display additional UI features, not shown in FIG. 2, such as the text displayed on the customer point of sale interface 222. In some embodiments, the full PIN pad window 224 may be displayed on the UI window 216 that indicates when the numbers are depressed on the customer terminal PIN pad window 224, but obscures the pressed numbers; a modified PIN pad window 224 may be displayed in the UI window 216 that displays the numbers but does not display when the numbers are depressed on the customer terminal PIN pad window 224; or a completely stripped-down version of the PIN pad window 224 may be displayed that is shown as a simple black box representing the PIN pad window 217 within the UI window 216 of the merchant point of sale interface 212.

The point of sale system 200 can implement a custom protocol that provides for shared control of the point of sale system 200. In this manner, during a first state where the merchant terminal is in control of the point of sale system, for example during the item input portion of a point of sale transaction, the merchant terminal can be designated as a state control terminal and the customer terminal can be designated as the non-state control terminal. During a second state where the customer terminal is in control of the point of sale system, for example during the payment input portion of the point of sale transaction, the customer terminal can be designated as the state control terminal and the merchant terminal can be designated as the non-state control terminal. The system can have a predefined, limited, or infinite number of states, and the protocol designates which terminal is in control for each state of the system.

Figure 3:
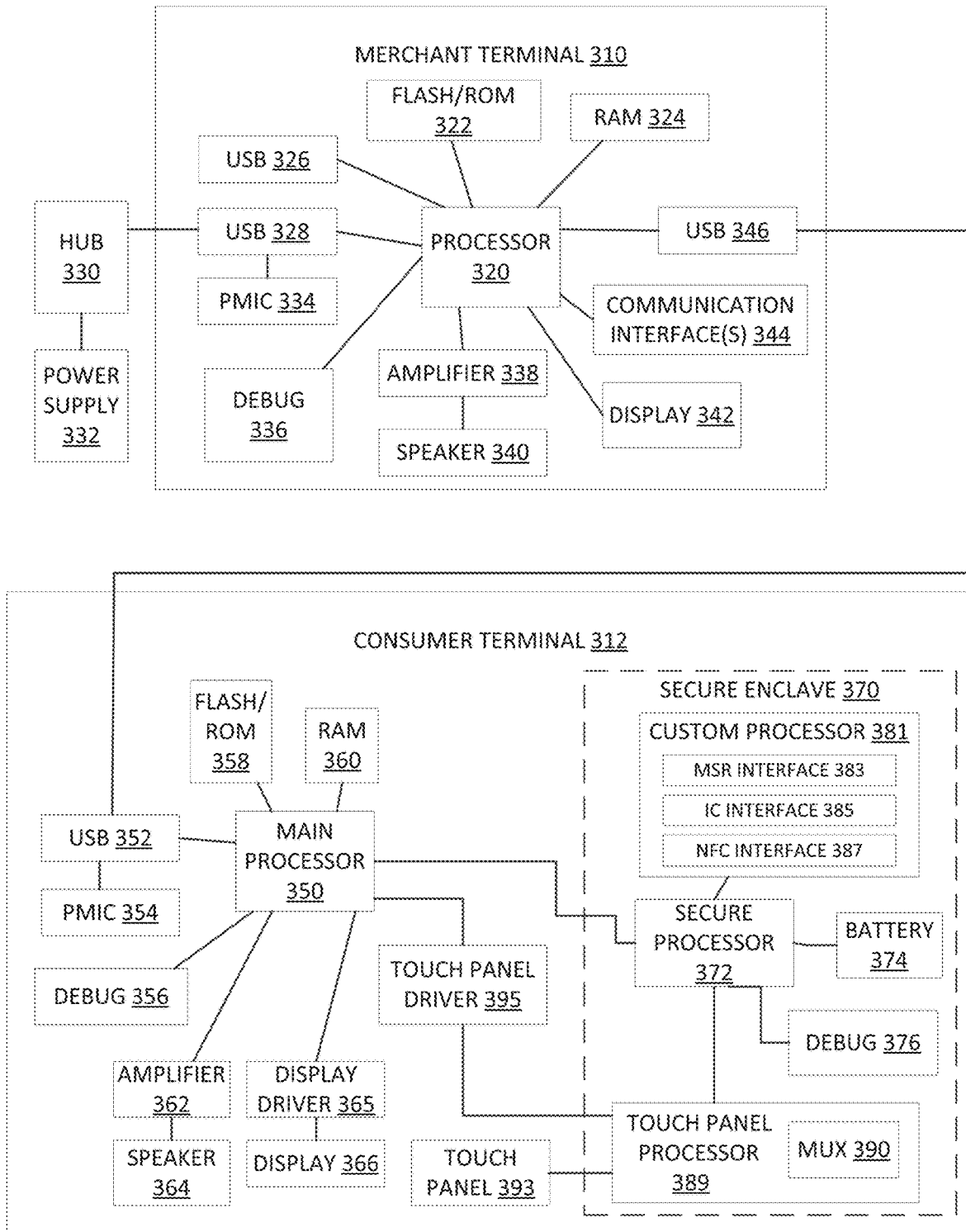
FIG. 3 illustrates an example schematic diagram of components of each terminal in a point of sale system for enabling transactions between merchants and buyers.

Reference is now made to FIG. 3 illustrating an example schematic diagram of components of each terminal in the point of sale system in accordance with an embodiment. The point of sale system includes a merchant terminal 310 and a customer terminal 312. The merchant terminal 310 includes non-transitory computer readable instructions stored in memory 322 that when interpreted by a merchant terminal processor causes the merchant terminal processor to display a series of screens in a display of the merchant facing graphical user interface for guiding a merchant through a point of sale transaction. The customer terminal 312 includes non-transitory computer readable instructions stored in memory 358 that when interpreted by a non-secure customer terminal processor causes the non-secure customer terminal processor to display a series of screens in a customer facing graphical user interface on the display for guiding the customer through the point of sale transaction.

The merchant terminal 310 includes a SoC (System-on-chip) processor 320 and associated flash memory 322 and RAM 324. A USB-A port 326 is provided for connecting other devices or components to the merchant terminal 310 as appropriate. A USB+Power port 328 is provided connected to a hub 330 for various peripherals associated with a point of sale system, including a receipt printer, cash drawer, barcode scanner, scale, keyboard, USB-Ethernet dongle/USB mifi, and other point of sale peripheral components known in the art. The hub 330 can be a 5-port USB hub in some embodiments. While both a USB-A port and a USB+Power port are separately identified, such should not be considered limitation. Additionally, although the connectors are shown as being USB, any universal adapter can be implemented to connect other devices to the merchant terminal and to connect the merchant terminal to the customer terminal. A Power Management Integrated Circuit (PMIC) 334 is in communication with the connector 328, which can be any appropriate connector, such as USB, mini-USB or micro-USB. A PMIC is an integrated circuit for managing power requirements of the host system. Merchant terminal can have any number of USB ports, and the ports can be of any suitable characteristics. A power supply 332 can be provided as power through the hub 330 via connector 328 on the merchant terminal 310. In some embodiments, power can be provided directly to the merchant terminal, for example via USB connector 326. A debug application 336 is provided for appropriate debugging of the merchant terminal 310 and the various components thereof. An audio amplifier 338 is provided and a speaker 240 for providing the appropriate audio for the merchant terminal 310. A display 242 can be connected to the processor 320, for example a 13.3-inch LCD display having a resolution of 1920×1080 IPS 166 PPI. The display 342 provides the interfaces and outputs to the merchant terminal 310 to be viewed by a merchant. A communication interface(s) 344 is in communication with the processor 320 to perform the communication for the merchant terminal, for example, with the customer terminal and other point of sale system components, or for example a payment system. The communication interface 344 can include one or more interfaces and hardware components for enabling communication with various other devices, such as over the network(s) 114 shown in FIG. 1. For example, communication interface 344 can enable communication through one or more of the internet, cable networks, wireless networks (e.g., Wi-Fi), and wired networks, as well as close-range communications, such as Bluetooth®, Bluetooth® Low Energy (BLE), near field communication (NFC) and the like, as additionally enumerated elsewhere herein. The communication interface(s) can include a GPS transceiver, a Wi-Fi transceiver, and other appropriate communication mediums.

In some embodiments, the communication interface 344 can include a cellular communications transceiver for sending and receiving data over a cellular communications network such as via voice call, short messaging service (SMS), multimedia messaging service (MMS), hypertext transfer protocol (HTTP), direct data connection, WTP, e-mail or another suitable type of electronic communication. In some embodiments, the communication interface 344 also provides other conventional connections to the network for distribution of files and/or media objects using standard network protocols such as TCP/IP, HTTP, HTTPS and SMTP, etc.

A USB port 346 is provided for detachably connecting the merchant terminal 310 to the customer terminal 312. The term "detachably" is intended to refer to the ability for the merchant terminal to be connected to the customer terminal but also configured to being detached from the customer terminal when desired for storage, upgrades, or other uses. This mating between the terminals can be through direct wired connections shown or wirelessly, in some embodiments.

Other components included in the merchant terminal 310 can include various types of sensors (not shown), which can include a GPS device, an accelerometer, gyroscope, compass, proximity sensor, etc. Additionally, the merchant terminal 310 can include various other components that are not shown, examples of which includes removable storage, an internal power source such as a battery and a power control unit, and so forth.

The customer terminal 312 includes a processor 350 connected to the connector 352 (e.g., USB, mini-USB or micro-USB) for communication with the merchant terminal 310. The processor 350 can be a system on a chip (SoC) processor in some embodiments. A Power Management Integrated Circuit (PMIC) 354 is in communication with the micro USB connector 352. A PMIC is an integrated circuit for managing power requirements of the host system. A debug application 356 is provided for the processor 350 for the appropriate debugging of the customer terminal 212 and the various components thereof. The processor 350 is coupled to flash memory 358 and RAM 360 for appropriate storage and processing of data. An audio amplifier 362 and speaker 364 are provided for any audio for the customer on the customer terminal 312. A display 366 is provided, such as a 7-inch LCD touch-screen display having a resolution of 1280×800 IPS 316 PPI. The display 366 provides interfaces and the outputs of the point of sale system to the customer terminal 312. A display driver 365 controls the display 366.

Memory in the merchant terminal 310 and the customer terminal 312, including flash/ROM 322, RAM 324, flash/ROM 358 and RAM 360 are examples of non-transitory computer storage media (e.g., computer-readable media) and can include volatile and non-volatile memory and/or removable and non-removable media implemented in any type of technology for storage of information such as computer-readable processor-executable instructions, data structures, program applications or other data. The computer-readable media can include, but is not limited to, RAM, ROM, EEPROM, flash memory, solid-state storage, magnetic disk storage, optical storage, and/or other computer-readable media technology. Further, in some cases, the merchant device 310 can access external storage, such as RAID storage systems, storage arrays, network attached storage, storage area networks, cloud storage, or any other medium that can be used to store information and that can be accessed by the processor directly or through another computing device or network. Accordingly, the memory 322, 324 or 358, 360 can be computer storage media able to store instructions, applications or components that can be executed by the processor 320 or 350, respectively.

The display 366 of the customer terminal 312 (and, likewise the display 342 of the merchant terminal 310) can employ any suitable display technology. For example, the display 342 and the display 366 can be a liquid crystal display (LCD), a plasma display, a light emitting diode (LED) display, an OLED (organic light-emitting diode) display, an electronic paper display, or any other suitable type of display able to present digital content thereon. The customer terminal can include a touch panel 393 associated with the display 366 to provide a touchscreen display configured to receive touch inputs for enabling interaction with a graphical user interface presented on the display. Accordingly, embodiments described herein are not limited to any particular display technology. In some embodiments, the merchant device may not include a display, and information can be presented via the speaker 364.

The customer terminal 312 includes a secure enclave 370 is included in the customer terminal 312. The secure enclave includes a secure processor 372 coupled to the main terminal processor 350, an anti-tamper battery 374, and a secure debug application 376. Each processor, including the merchant terminal processor 320, the customer terminal main processor 350, the secure processor 372, the custom processor 381 and the touch panel processor 389, can each comprise one or more processors or processing cores. For example, the processor(s) 320, 350, 372, 381 and 389 can be implemented as one or more microprocessors, microcomputers, microcontrollers, digital signal processors, central processing units, state machines, logic circuitries, and/or any devices that manipulate signals based on operational instructions. In some embodiments, the processor(s) 320, 350, 372, 381 and 389 can be one or more hardware processors and/or logic circuits of any suitable type specifically programmed or configured to execute the algorithms and processes described herein by performing various input/output, logical, and/or mathematical operations. The processor(s) 320, 350, 372, 381 and 389 can be configured to fetch and execute computer-readable processor-executable instructions stored in the memory 322, 324, 358 and 360.

The touch panel processor, in some embodiments, can comprise the Cirque Cortex microcontroller chip, having an analog front end (AFE), a multiplexer and a microcontroller.

The secure processor receives inputs from the custom processor 381 equipped with a magnetic stripe interface 383, an integrated circuit interface 385 and a near field communication (NFC) interface 387.

All inputs received by the customer terminal are received at the touch panel 393 within the secure enclave 370 (for example, as entries into a payment application or a register-buddy application in communication with the merchant terminal). Inputs received at the touch panel 393 are sent to the touch panel processor 389 having a multiplexer 390. The touch panel processor 389 is configured to put the customer terminal into (1) a secure mode where secure data does not leave the enclave 370, and (2) a normal pass-through mode when the secure processor determines completion of the secure data entry, where data is passed through to the main processor 350. All entries into the touch panel are received at the secure enclave and initially handled by the secure processor. When in the pass-through mode, the secure processor passes all inputs through to the main processor. When in the secure touch mode, the secure processor does not pass any inputs to the main processor, but rather processes the data within the secure enclave.

A multiplexer 390 receives inputs from a touch panel 393 and directs inputs to the main processor 350, via the touch panel driver in a pass-through mode, and directs inputs received in the touch panel to the secure processor when in the secure mode. In some embodiments, the main processor on the merchant terminal and the customer terminal will each run their own operating system (including possibly two different copies of the same operating system, different versions of the same operating system, or different operating systems altogether, etc.).

Figure 4:
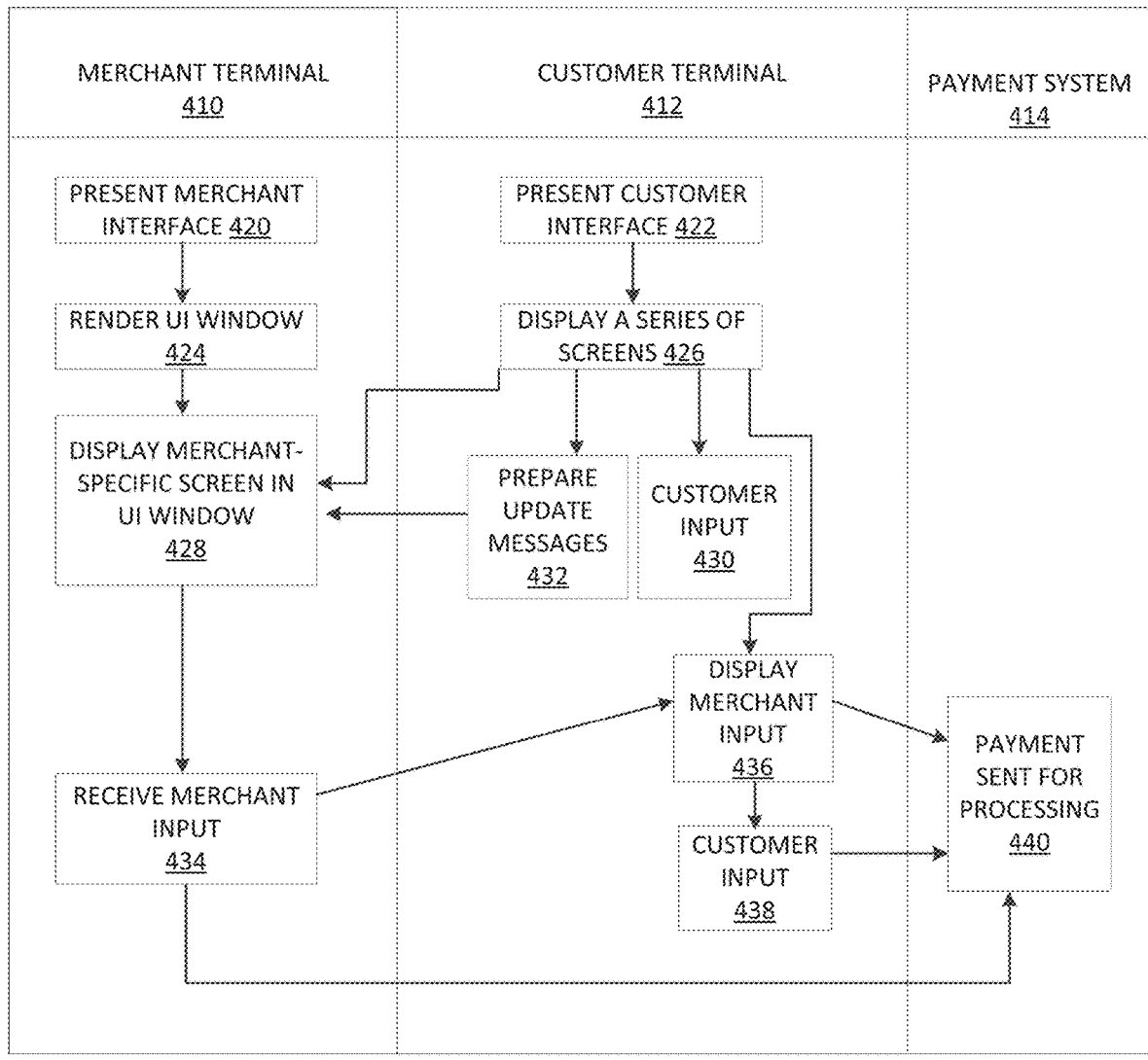
FIG. 4 illustrates an example diagram of flow of data between the components of the point of sale system in accordance with various embodiments.

Reference is now made to FIG. 4 illustrating an example diagram of flow of data between the components of the point of sale system in accordance with various embodiments. The flow of data between the merchant terminal 410, customer terminal 412 and the payment system 414 are shown. The merchant terminal 410 can be, for example, the merchant terminal 210 of FIG. 2 or the merchant terminal 310 of FIG. 3. The customer terminal 412 can be, for example, the customer terminal 220 of FIG. 2 or the customer terminal 312 of FIG. 3.

In accordance with the example diagram, a merchant point of sale interface is presented 420 at the merchant terminal 410. Likewise, a customer point of sale interface is presented 422 at the customer terminal 412. A user interface (UI) window at 424 (showing a version of a screen displayed on the customer point of sale terminal 412) is rendered on the merchant point of sale interface of the merchant terminal 410. The customer terminal 412 displays a series of screens 426 on the customer point of sale interface of the customer terminal 412. At least one of these screens can be displayed in the UI window on the merchant terminal 410. The customer terminal 412 can inform the merchant terminal 410 about the screen that is currently displayed through a message that is sent from the customer terminal 412 to the merchant terminal 410. The merchant-specific screen is displayed in the UI window at 428 on the merchant terminal 410. For example, the merchant-specific screen displayed in the UI window at 428 can be the UI window 217 of FIG. 2, which displays a merchant-specific version of the point of sale interface 222 of the customer terminal 220. The customer input at 430 to the customer terminal 412 can be received and processed by the customer terminal 412. Customer input can be received at 430 on the customer interface of the customer terminal 412, and the customer terminal 412 can prepare update messages at 432, which can be transmitted to the merchant terminal 410 to be displayed in the UI window. A merchant input 434 can be received on the UI window by a merchant interacting with at least one UI feature in the merchant UI window. The version of the screen displayed on the customer terminal has at least some of a plurality of UI features displayed on the customer terminal. In this manner, the merchant is able to view the merchant point of sale interface as well as the version of the screen displayed on the customer terminal.

It is advantageous for the merchant at the merchant terminal to be aware of the display that is shown to the customer at the customer terminal, as well as to allow the merchant to provide feedback to the customer on the customer point of sale interface. A merchant input received at 434 on the UI window of the merchant terminal 410 can be sent to the customer terminal 412. The merchant input can then be displayed on the customer point of sale interface at 436. The merchant input can then be displayed on the customer terminal, or sent to the customer terminal and received by the customer terminal as though the input were received on the customer terminal by a customer interacting with the customer terminal. When the merchant input is intended to be received by the customer terminal as a customer input, the merchant terminal can send a message to the customer terminal, indicating that the inputs should be received by the customer terminal. The customer terminal can be required to approve the message before the input is received as a customer input. The merchant input can then be received as a customer input 438, which can be sent to the payment system 414 for processing at 440. The merchant input can also be displayed on the customer terminal 412 and then sent directly to the payment system 414 for processing at 440, as though the merchant input were received on the customer terminal 412. The merchant input at 434 can also be directly sent to the payment system 414 in some embodiments for processing at 440.

The point of sale system can implement a custom protocol that provides for shared control of state of the point of sale system. In this manner, during a first state where the merchant terminal is in control of state of the point of sale system, for example during the item input portion of a point of sale transaction, and the merchant terminal can be designated as a state control terminal and the customer terminal can be designated as the non-state control terminal. During a second state where the customer terminal is in control of state of the point of sale system, for example during the payment input portion of the point of sale transaction, the customer terminal can be designated as the state control terminal and the merchant terminal can be designated as the non-state control terminal. The custom protocol can specify the number of messages that are acceptable to be received by the non-state control terminal during the specified state.

Figure 5:
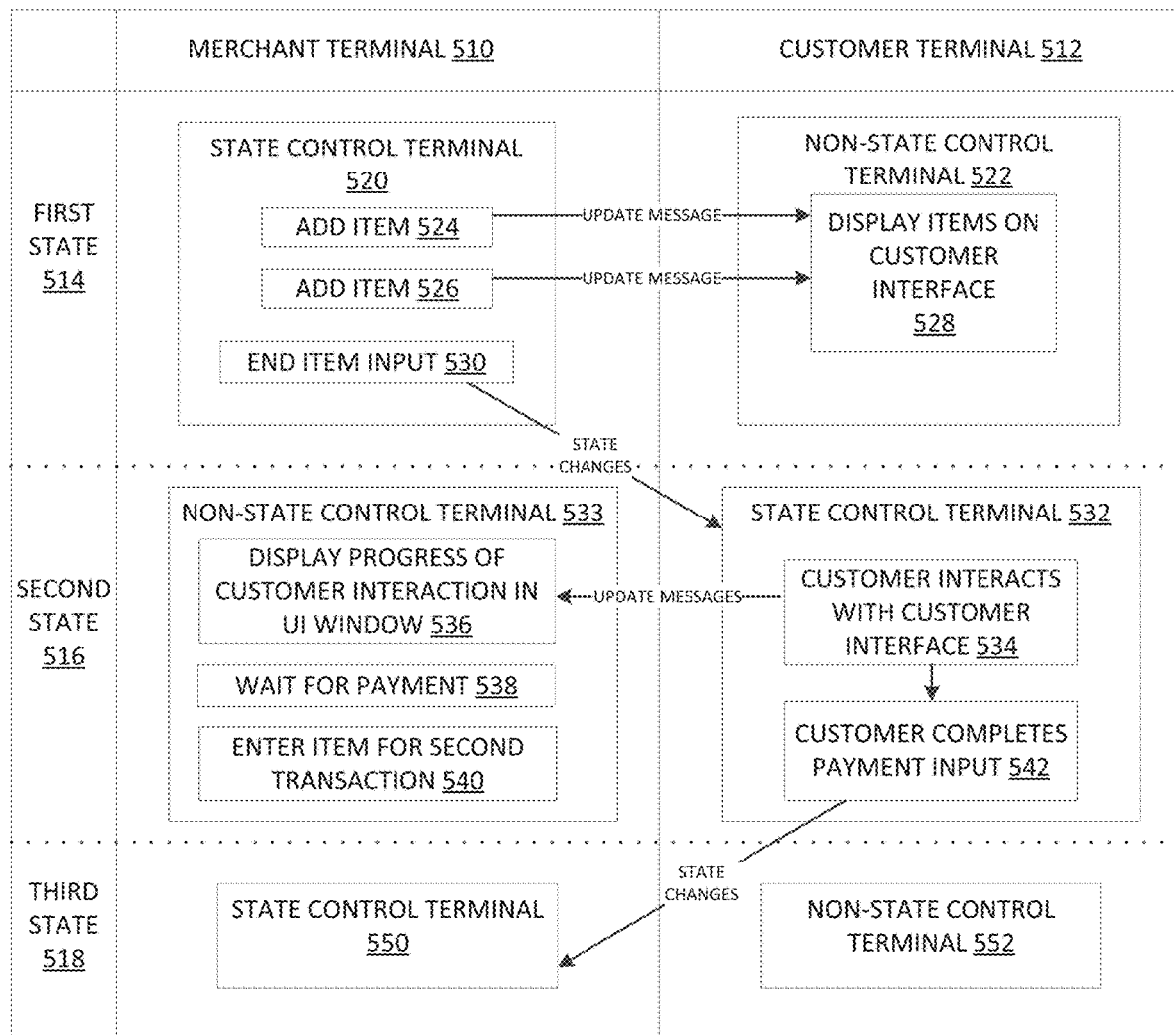
FIG. 5 illustrates an example diagram of the various states of the point of sale system and showing the control of the flow of data between the merchant terminal and the customer terminal for each state.

FIG. 5 illustrates an example diagram of control of data between the merchant terminal customer terminal, and the associated state of the point of sale transaction. The example diagram shows the two different states available in the shared control point of sale system having a merchant terminal 510 and a customer terminal 512. The states are shown as a first state 514, a second state 516 and a third state at 518. It should be clear that the first state, second state, and third state, are examples for illustrative and descriptive purposes only, and a system can have any number of states, including at least these three states in some embodiments.

The system implements a custom protocol that transitions control of state between the merchant terminal and the customer terminal as a transaction progresses. The point of sale system includes one or more non-transitory computer readable media having computer readable instructions stored thereon that, when executed by one or more of the processors (e.g. the processor(s) 320, 350, 372, 381 and 389 shown in FIG. 3) of the point of sale system are configured to specify a state for the point of sale system, render a UI window on the merchant terminal and cause the customer terminal to send update messages to the merchant terminal that are relevant to the specified state.

The system can divide data into confidential data (such as PIN numbers, account data, etc.), that can be stored exclusively on one "confidential" terminal, and non-confidential data that can be stored by another "non-confidential" terminal. The data can be encrypted or otherwise formatted by the confidential terminal so that it is not accessible or readable by the non-confidential terminal. By providing a system with shared control, confidentiality can be maintained, and when the confidential data is accessed and/or otherwise processed, the confidential terminal is in control of the state of the system, and when the non-confidential data is accessed and/or processed the non-confidential terminal is in control of the state of the system. In some embodiments, the confidential terminal is the customer terminal that stores the confidential data, and the non-confidential terminal is the merchant terminal. It is also possible for the confidential terminal to be the merchant terminal, and the non-confidential terminal to be the customer terminal.

In a first state 514, the merchant terminal 510 is the state control terminal at 520, and the customer terminal 512 is the non-state control terminal 522. When the merchant terminal 510 is the state control terminal 520, items can be added 524, 526, for example to an electronic shopping cart, order, ticket, or other electronic list of items. Each time an item is added to the cart, an update message can be sent to the customer terminal to display items on the customer interface 528. At 530 at the end of the item input, the state of the system changes and the customer terminal 512 now becomes the state control terminal 532 and the merchant terminal 510 now becomes the non-state control terminal 533. The end of the item input portion of a first point of sale transaction 530 can automatically cause the state of the point of sale system to change, or there can be a button displayed on the merchant terminal 510 to manually change the state so the customer terminal is the state control terminal. While the customer terminal is the state control terminal 532, the customer interacts with the customer interface 534 on the customer terminal 512. As the customer interacts with the customer interface 534, update messages are sent to the merchant terminal 510. The process of the customer interaction can be displayed in a UI window 536 on the merchant terminal 510. The merchant terminal can wait for payment 538 and can also enter the item input portion for a second transaction 540. When the customer completes the payment input portion 542 of the first point of sale transaction on the customer terminal 512, the merchant terminal 510 once again becomes the state control terminal 550 and the customer terminal 512 becomes the non-state control terminal 552. The state can automatically change when the payment portion completes 542 or there can be a button to manually complete the customer interaction with the first point of sale transaction.

In some embodiments, the status of the point of sale transaction is determined by the point of sale system to appropriately designate the customer terminal and the merchant terminal as the non-state control terminal or the state control terminal. For example, when the status of the point of sale transaction is determined to be in an item input portion, the merchant terminal can be designated as the state control terminal. Also, for example, when the status of the point of sale transaction is determined to be a payment input portion, the customer terminal can be designated as the state control terminal.

It should be apparent that it is possible for the merchant terminal to be either the state control terminal or non-state control terminal while the item input portion for a point of sale transaction is entered on the merchant terminal. For security purposes, in some embodiments, the customer terminal can be configured to always be the state control terminal when the payment portion of a transaction is performed. In this manner, the non-state control terminal has to request regaining control from the state control terminal, to prevent unwanted acquiring of access to the data within the customer terminal, such as sensitive payment or customer information.

Figure 8:
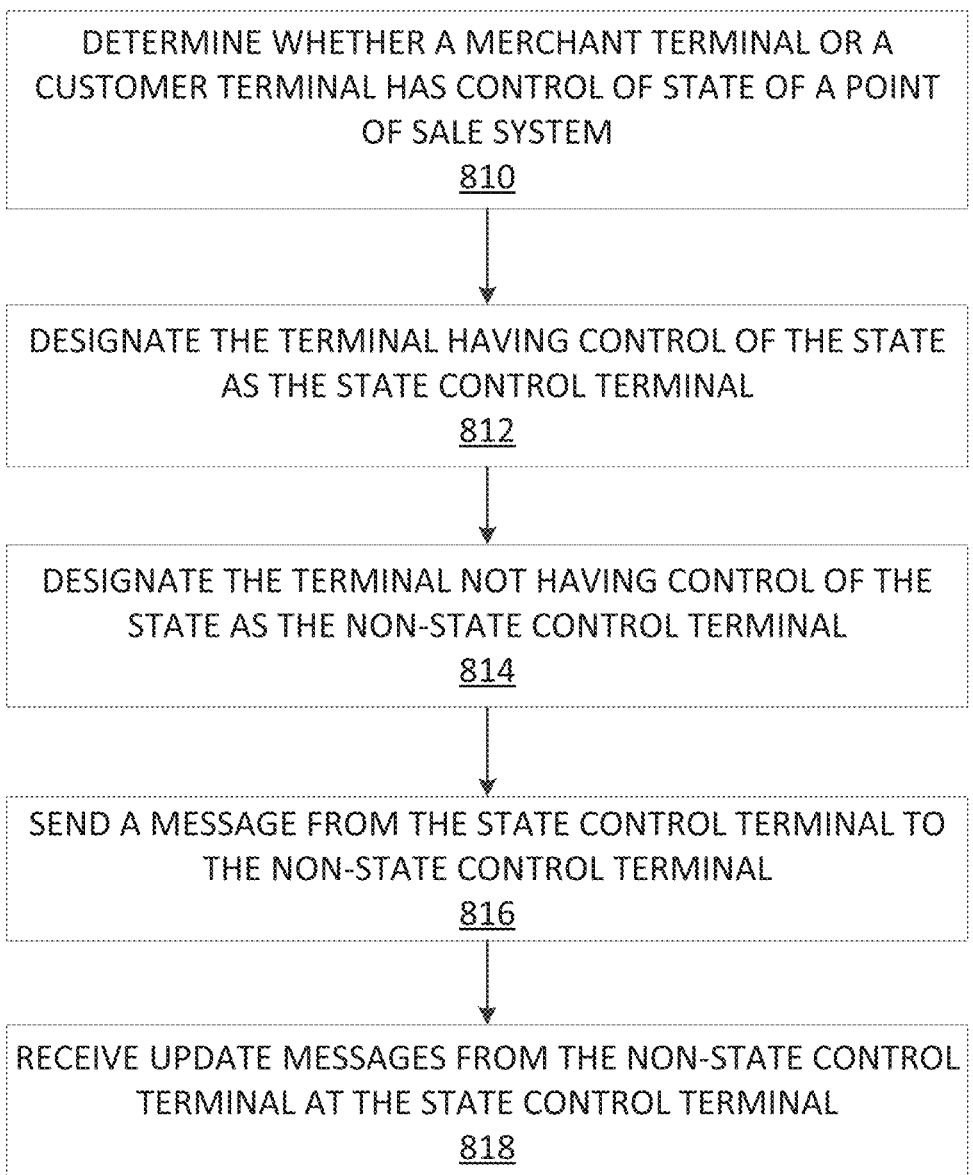
FIG. 8 illustrates an example diagram of flow of data for communicating between a merchant terminal and a customer terminal in a point of sale transaction, detailing state control.

Reference is now made to FIGS. 6-8 showing example diagrams of flow of data for communicating between a customer terminal and a merchant terminal of a point of sale system during a point of sale transaction in accordance with various embodiments.

FIG. 6 illustrates an example diagram of flow of data for communicating between a merchant terminal and a customer terminal in a point of sale transaction, where a user interface (UI) window is rendered on a merchant terminal and update messages are sent from the customer terminal to the merchant terminal. In accordance with the example diagram of the flow of data 600, at 610 a state for a point of sale system is specified, where the point of sale system has a merchant terminal and a customer terminal. Each state for the point of sale system corresponds to a screen to display and a plurality of user interface (UI) features to display for each of the merchant terminal and the customer terminal. The point of sale system can have an infinite number of states, and each state is designated as having one of the merchant terminal or the customer terminal is in control of the state. The merchant terminal and the customer terminal are each responsible for rendering an appropriate image in the merchant point of sale interface and the customer point of sale interface on the respective merchant terminal and customer terminal. Thereby, the presentation of both the merchant terminal and the customer terminal are coordinated interfaces on their respective displays.

At 612, a UI window is rendered on the merchant terminal for the specified state. The UI window displays a version of the screen displayed on the customer terminal. The version of the screen displayed on the customer terminal that is displayed in the merchant UI window on the merchant terminal is a merchant specific version of the screen displayed on the customer terminal. The merchant specific version of the screen displayed on the customer terminal that is displayed in the merchant UI window includes at least some of a plurality of UI features displayed on the customer terminal.

At 614, update messages are sent from the customer terminal to the merchant terminal. The update messages are relevant to the specified state of the point of sale system. A new update message can be sent each time a customer interaction is received in the customer point of sale interface rendered on a display of the customer terminal. For example, during entry of a PIN into a PIN pad window of a customer terminal, in some embodiments an update message can be sent each time a number is pressed, updating the merchant as to the number of buttons pressed. In other embodiments, there can be a single update message sent from the customer terminal to the merchant terminal upon completion of the PIN entry into the customer terminal PIN pad window.

In some embodiments, the point of sale system can implement a custom protocol that causes the customer terminal and the merchant terminal to designate which one of the merchant terminal and the customer terminal have state control. The custom protocol controls the exchange of messages and rendering of UIs and UI features on the customer terminal and the merchant terminal. The custom protocol can designate a specified number of messages that are considered acceptable in a specified state. In some embodiments, the status of the point of sale transaction is used to determine which terminal has control of state of the point of sale system. For example, when the status of the point of sale transaction is an item input portion, the merchant terminal can be designated as the state control terminal, and when the status of the point of sale transaction is a payment input portion, the customer terminal can be designated as the state control terminal. It should be apparent that in some instances the state of the point of sale transaction can be item input (i.e. for a second point of sale transaction) while the customer terminal is the state control terminal (i.e. the customer terminal is performing the payment input portion of the first point of sale transaction). The custom protocol can designate that the customer terminal is the state control terminal each time a payment input portion is performed on the customer terminal.

FIG. 7 illustrates an example diagram of flow of data for communicating between a merchant terminal and a customer terminal in a point of sale transaction, where a merchant input is received on a UI window of the merchant terminal, and the point of sale system proceeds as if the merchant input were received on the customer terminal. In accordance with the example diagram of the flow of data 700, at 710 a UI window is rendered on a merchant terminal. The UI window displays a merchant-specific version of a screen displayed on a customer terminal. The merchant-specific version displayed on the UI window on the merchant terminal, in some embodiments, does not include a PIN (personal identification number) pad window that is displayed on the customer terminal, so that the merchant-specific version displayed on the UI window on the merchant terminal does not display the sensitive information. In some embodiments, the UI window on the merchant terminal can be rendered to include all of the UI features shown in the customer point of sale interface, including the PIN pad window. The UI window can be rendered on the merchant terminal to include the PIN pad display that is displayed on the customer point of sale interface, without showing the details of each PIN pad entry on the merchant UI window. Upon completion of the PIN entry, the customer terminal can send an update message to the merchant terminal indicating completion of the PIN entry. The version of the screen displayed on the customer terminal that is rendered in the merchant UI window has at least some of a plurality of UI features that are displayed on the customer terminal. The merchant is able to view the merchant point of sale interface concurrently while viewing the version of the screen displayed on the customer terminal. The merchant is also able to be privy to the customer interaction with the customer terminal, which can particularly be useful in environments where a customer terminal is located remote from the merchant terminal, for example separated in distance on a countertop at a merchant location.

At 712, a merchant input is received at the merchant terminal by a merchant interacting with one of the UI features in the merchant UI window (displayed as a version of what is currently displayed on the customer device) on the merchant terminal. The merchant terminal sends a message to the customer terminal indicating the received input. The message can also indicate how the customer terminal is to interpret and/or render the merchant input received on the merchant UI window. For example, the merchant input can be rendered as a UI feature, such as a string of text or a visual indicator, on the customer point of sale interface. This can be rendered in a separate UI window on the customer interface that is a transparent overlay on the customer interface. The merchant input can be rendered as a separate UI window on the customer interface that is not transparent with respect to the customer point of sale interface. The merchant input can comprise a set of directions for guiding the customer through the payment on the customer point of sale interface, and the direction can be displayed in a customer UI window, the set of directions being received as merchant input in the UI window of the merchant terminal. The customer terminal UI window is configured to display the merchant input received on the merchant terminal. The message can indicate that the merchant input received at the merchant UI window is to be interpreted by the customer terminal as though the input has been received by the customer point of sale interface. The message can indicate that how the merchant input is to be displayed on the customer point of sale interface.

In some embodiments, the point of sale transaction can be cancelled by the merchant interacting with the merchant UI window displayed on the merchant interface of the merchant terminal at any time prior to approval of payment of the point of sale transaction. The point of sale transaction can be terminated by the customer terminal in response to receiving a cancellation message from either the merchant terminal or a customer interacting with the customer terminal. The cancellation message, when received from the merchant terminal, can first be confirmed with the customer terminal to ensure that it is still within a valid time period for cancellation of the point of sale transaction, the valid time period for cancellation of the point of sale transaction being any time up until the approval of payment for the transaction by the customer terminal.

At 714, the point of sale system proceeds as if the merchant input were received on the customer terminal. For example, if a merchant input indicates that the customer should press a particular UI feature on the customer point of sale interface, the merchant terminal and the customer terminal both proceed as if the UI feature were depressed on the customer point of sale interface.

FIG. 8 illustrates an example diagram of flow of data for communicating between a merchant terminal and a customer terminal in a point of sale transaction, detailing state control. In accordance with the example diagram of the flow of data 800, at 810 the point of sale system conforming to a custom protocol designates whether a merchant terminal or a customer terminal of a point of sale system has control of state for the point of sale system. The custom protocol can be implemented by the point of sale system as hardware, software, or a combination of both, within the merchant terminal and the customer terminal for communicating, including sending and receiving of messages and other data, and rendering of data and UI features and interfaces on the display. The customer terminal and the merchant terminal can each determine the state of the system. Referring back to FIG. 5, the example diagram of control of data between the merchant terminal and the customer terminal, and the associated state of the point of sale transaction. The example diagram shows the two different states available in the shared control point of sale system. During the first state, the merchant terminal is in control of state of the point of sale system, and during the second state, the customer terminal is in control of state of the point of sale system.

Referring back to FIG. 8, at 812, the terminal having control of the state for the point of sale system is designated as the state control terminal, and at 814 the terminal not having control is designated as the non-state control terminal. For example, when a screen in the payment flow is to be displayed, the custom protocol designates which of the merchant terminal or the customer terminal is to be in control of state for that screen. When a screen is displayed for which the custom protocol designates 810 that the merchant terminal is designated as the state control terminal at 812 and the customer terminal is to be the non-state control terminal at 814. In the inverse, at 812 is can be designated that the customer terminal is the state control terminal and at 814 the merchant terminal can be designated as the non-state control terminal.

In some embodiments, the status of the point of sale transaction can correspond with a point in the customer protocol, and appropriately designates the merchant terminal or the customer terminal as the terminal in control of state for the point of sale system. For example, the custom protocol can designate that the merchant terminal is in control during the item input portion. In some embodiments, specific state control messages can be sent indicating the terminal that is in control of state of the point of sale system.

In some embodiments, a trigger event can change control of state of the point of sale system. A trigger event can be a manual input at the merchant terminal or the customer terminal, or can depend upon the state of the transaction, or an automatic occurrence in response to an action performed on either terminal. For example, the trigger event can be completion of the item input portion or completion of the payment input portion to transfer control of state of the point of sale system in response to detecting the occurrence of the trigger event.

At 816, a message is sent from the state control terminal to the non-state control terminal. The message can specify the state of the point of sale system, and a user interface (UI) element that is to be interpreted and rendered by the non-state control terminal. For example, in accordance with the various embodiments herein, when the customer terminal is in control of state of the point of sale system during the payment portion of a point of sale transaction, the customer terminal is in control of state of the point of sale system and sends a message to the merchant terminal that specifies the state of the point of sale system and a UI element (for example the PIN pad window) that is to be interpreted and rendered by the merchant terminal. As another example, when the merchant terminal is in control of the state of the point of sale system it can send a message to the customer terminal that specifies the state of the point of sale system and a UI element that is to be interpreted and rendered by the customer terminal. The customer terminal will then render the UI element according to the custom protocol as appropriate for the customer terminal given the state of the system.

A message can be sent from the state control terminal to the non-state control terminal that causes a UI window to be displayed on the non-state control terminal, such that the UI window includes a UI element that is to be interpreted and rendered. An update message can be sent from the non-state control terminal to the state control terminal each time an interaction is received on the UI window.

At 818, the state control terminal receives update messages from the non-state control terminal. The update messages are descriptive of interactions with the UI element rendered by the non-state control terminal. For example, when the customer terminal is the state control terminal and the merchant terminal is the non-state control terminal, the merchant terminal can send update messages to the customer terminal regarding the interactions by the merchant with the UI element rendered by the merchant terminal. As specified by the custom protocol, the update messages can include a specified number of messages that are considered acceptable in the specified state.

A cancellation message can be received from either the merchant terminal or the customer terminal to cancel the transaction. The cancellation message can first be confirmed by the state control terminal to verify that the cancellation message is received within a valid time period for cancellation. For example, the state control terminal checks to verify that the transaction is within the valid time period (i.e. has not been already authorized) before allowing cancellation of the transaction. This is to avoid situations where the transaction is believed to be "cancelled" but has actually been approved by the merchant terminal or the customer terminal.

Figure 9:
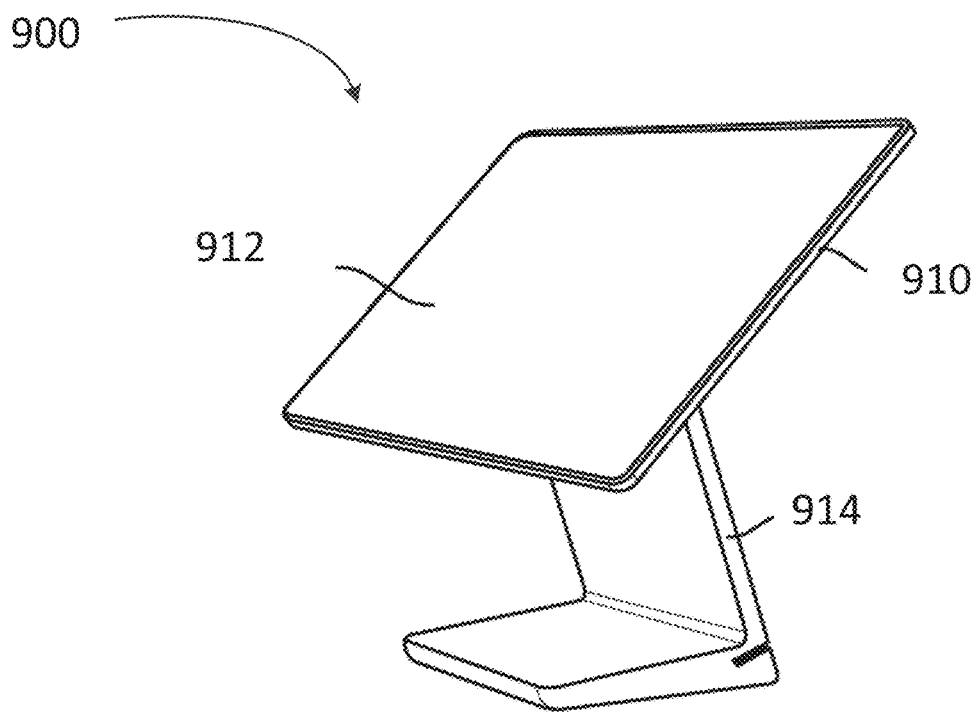
FIG. 9 illustrates an example point of sale system as viewed from a front perspective view, including a first terminal and a second terminal that are detachably mated together and shown in a fixed position, in accordance with various embodiments.

Reference is now made to FIGS. 9-12 illustrating an example point of sale system 900. FIG. 9 illustrates an example point of sale system 900 as viewed from a front perspective view, including a first terminal and a second terminal that are detachably mated together and shown in a fixed position, in accordance with an embodiment. The point of sale system 900 includes a first terminal 910 configured, for example, to be a merchant terminal in a merchant-facing direction. The first terminal 910 includes a first computing device 912 and a base 914 into which the second terminal is detachably received. The first computing device 912 can be a separate device that is inserted into the terminal or formed integral into the terminal as a single, unitary structure.

Figure 10:
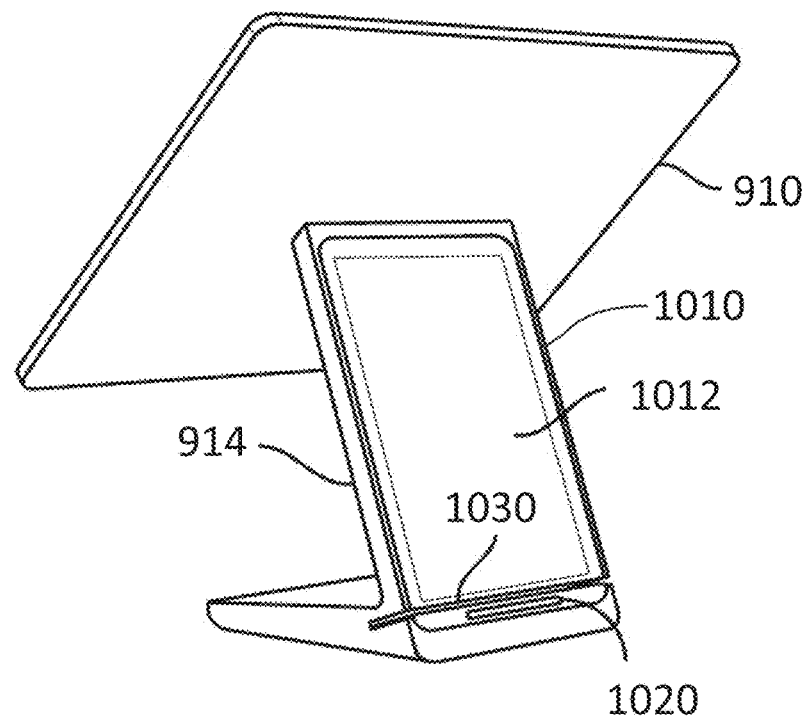
FIG. 10 illustrates the example point of sale system of FIG. 9 as viewed from a back perspective view, in accordance with various embodiments.

FIG. 10 illustrates the example point of sale system of FIG. 9 as viewed from a back perspective view, in accordance with some embodiments. The base 914 of the first terminal 910 detachably receives the second terminal 1010. The second terminal 1010 can include a first "dip slot" card reader 1020 configured to read chip-type cards and a second "swipe slot" card reader 1030 configured to read magnetic swipe-type cards. The term "dip slot" refers to a slot or other opening configured to receive or otherwise read a chip-type card via contact or contact-less EMV or NFC communication. In some embodiments, a separate NFC interface can be provided on the second terminal 1010. In some embodiments, the card reader 1020 and the card reader 1030 can be replaced with a single hybrid card reader configured to accept both chip-type card and magnetic stripe-type cards, as well as NFC enabled payment objects.

The first terminal 910 can be a merchant terminal capable of performing the various functionalities and features as shown and described herein. In some embodiments, the first terminal 910 can be the merchant terminal 210 shown in FIG. 2. The second terminal 1010 can be a customer terminal capable of performing the various functionalities and features as shown and described herein. In some embodiments, the second terminal 1010 can be the customer terminal 220 shown in FIG. 2, or the customer terminal 312 shown in FIG. 3.

The first computing device 912 can be configured to display a merchant point of sale interface (refer, for example to FIGS. 13-17 showing example merchant point of sale interfaces) and can also include the UI window. Likewise, the second computing device 1012 can display the customer point of sale interface.

Figure 11:
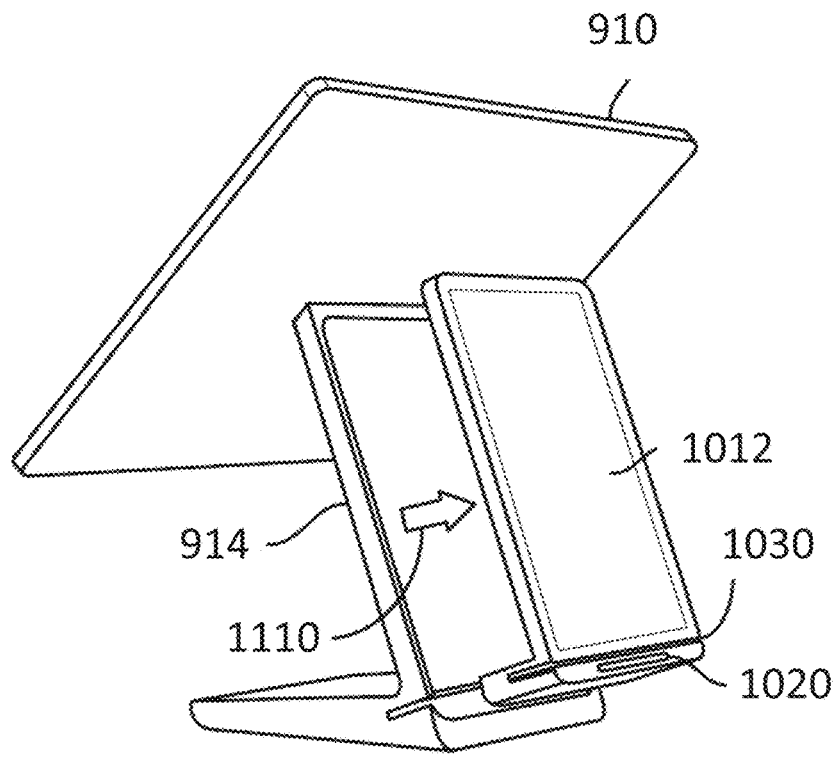
FIG. 11 illustrates the example point of sale system of FIG. 9 as viewed from the back perspective view, and showing the second terminal being separated from the first terminal, in accordance with various embodiments.

FIG. 11 illustrates the example point of sale system of FIG. 9 as viewed from the back perspective view, and showing the second terminal 1010 being separated with ease from the first terminal 910, as shown by arrow 1110.

Figure 12:
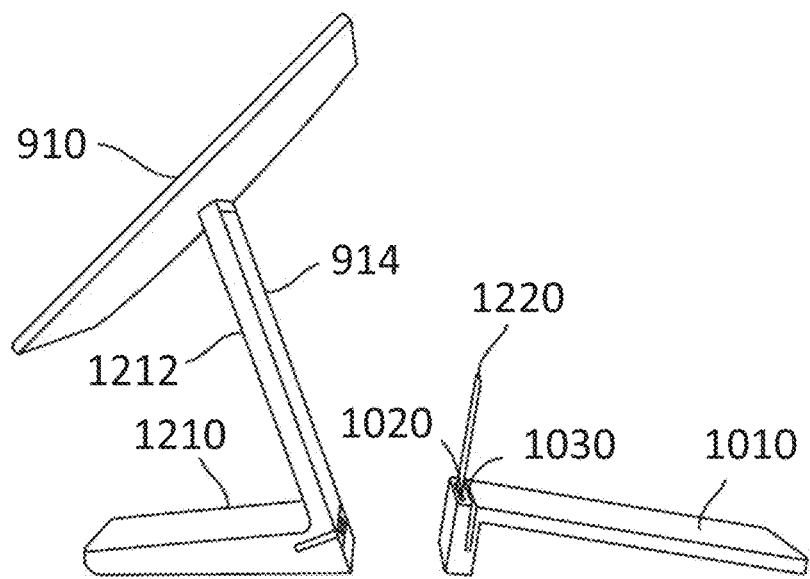
FIG. 12 illustrates the example point of sale system of FIG. 9 as viewed from a side perspective view and showing the second terminal completely separated from the first terminal, in accordance with various embodiments.

FIG. 12 illustrates the example point of sale system of FIG. 9 as viewed from a side perspective view and showing the second terminal completely separated from the first terminal. In this view, each terminal can be physically independent of the other and arranged in a separated position, or mated together as shown in FIG. 9. When separated as shown in FIG. 12, the first terminal and the second terminal are in communication with each other or otherwise mated together via wired or wireless communication. As shown in FIG. 12, the first terminal 910 includes a base 914 having a substantially flat portion 1210 that contacts a surface for supporting the first terminal 910 and an upper portion 1212. A payment card 1220 is shown inserted in the card reader 1020 of the second terminal 1010. The thin wedge shape of the second terminal 1010 welcomes customers to pick up and hold the second terminal 110 for usage of the terminal.

Reference is now made to FIGS. 13-17 illustrative example views of a merchant point of sale interface in accordance with various embodiments.

FIG. 13 illustrates an example view of a merchant facing terminal of a point of sale system displaying a merchant graphical user interface (GUI) in a "null" or ready state, in accordance with some embodiments. As shown in FIG. 13, an example GUI 1310 is displayed on a merchant facing terminal. The GUI 1310 can be displayed by a merchant application stored in memory of the merchant facing terminal that runs the merchant application. For example, the merchant application can be stored in ROM memory 316 of FIG. 3. The GUI 1310 includes an input portion 1320 that allows a merchant interacting with the merchant application to make selections. The GUI 1310 includes a "ticket" portion 1330 that displays details about the current ticket or tickets that are in the queue. Tickets that are in the "queue" have completed the item input portion of the point of sale transaction and have completed the payment portion of the point of sale transaction and the customer is still waiting for the item that is described in the point of sale transaction. By selecting on the item 1322 in the input interface 1320 of the GUI 1310, a new item can be added to a ticket, and the merchant is directed to a screen for completing the item input portion, for example the GUI 1410 in FIG. 14.

FIG. 14 illustrates an example view of a merchant facing terminal of a point of sale system displaying a merchant GUI after a merchant has selected an item to input for a first point of sale transaction, in accordance with some embodiments. By selecting the total purchase amount 1420, which is $73.70 for this example first point of sale transaction, the item input portion for the first point of sale transaction is now complete and the control of the state of the point of sale system can be transferred manually or automatically to the customer terminal. An indicator on the customer terminal can then prompt the first customer to initiate the payment portion for the first point of sale transaction.

FIG. 15 illustrates an example view of a merchant facing terminal displaying a merchant GUI showing payment options, in accordance with some embodiments. The example GUI 1510 is displayed on a merchant facing terminal. The GUI 1510 can be displayed by a merchant application stored in memory of the merchant facing terminal that runs the merchant application. The GUI 1510 provides merchants interacting with the merchant facing terminal with options for participating in the payment portion of the point of sale transaction. A merchant can select the item 1522 to split the check, if desired. There are also several options for selecting cash 1524 if the customer is paying with cash. The merchant can also enter a card number 1526 or perform another payment method 1528. Other orders 1530 and 1532 are also shown on GUI 1510. Although the merchant may select an option, the customer terminal still has control of the state of the point of sale system.

A merchant interacting with the merchant application can now commence a second point of sale transaction with a second customer on the merchant facing terminal while the payment portion of the first point of sale transaction is performed by the first customer interacting with the customer application on the customer facing terminal.

FIG. 16 illustrates an example view of a merchant facing terminal and displaying options available to a merchant once the item input portion of the first point of sale transaction is complete and control of state for the first point of sale transaction has been transferred to the customer facing terminal, in accordance with some embodiments. The merchant GUI 1610 includes the item input interface 1320 and an option 1620 for entering a new ticket. As shown, there is a new group of tickets titled "in progress" 1630 which includes the "current sale" 1640, referring to the sale that has a complete item input portion but is waiting for the payment portion to be complete. Other pending orders can also be listed on the UI 1610.

FIG. 16A illustrates an example view of a merchant facing terminal and further displaying a merchant UI window 1650 overlaid on the merchant GUI 1610 of the point of sale system. The merchant UI window 1650 allows the merchant to view the status of the transaction as seen on the customer terminal, which may not be visible to the merchant. Although the UI window 1650 is depicted as an overlay window that is overlaid on the merchant point of sale GUI 1610, in some embodiments the UI window 1650 can be a separate window from the GUI 1610, both displayed on a display of the merchant terminal, so as to not obscure any portion of the GUI 1610. The UI window 1650 in some embodiments can be at least partially transparent so that the underlying text or images are still visible. The size, placement, and positioning of the UI window 1650 can be varied in accordance with ordinary skill.

FIG. 17 illustrates an example view of a merchant facing terminal displaying a merchant GUI for a merchant to initiate a second point of sale transaction, in accordance with some embodiments. FIG. 17 illustrates an example view of a merchant facing terminal displaying a merchant GUI 1710 for a merchant to initiate a second point of sale transaction, in accordance with some embodiments. The item input interface 1320 allows the merchant to interact with the merchant application to add new items to the ticket. As shown by "New Ticket" 1730, a new ticket has been started. The progress of the first point of sale transaction is also shown on the GUI 1710 in an area 1720 which displays the text "Choosing Account" for example, when a customer is still performing the payment portion of the first point of sale transaction.

Reference is now made to FIGS. 18A-21B. In accordance with various embodiments, a user interface (UI) window can be displayed on a merchant point of sale interface, for example the GUIs 1310, 1410, 1510, 1610 and 1710 of FIGS. 13-17. FIGS. 18A, 19A, 20A and 21A show example views of a UI window that is to be displayed on the merchant point of sale interface, and respective customer point of sale interface in FIGS. 18B, 19B, 20B and 21B.

Figure 18A:
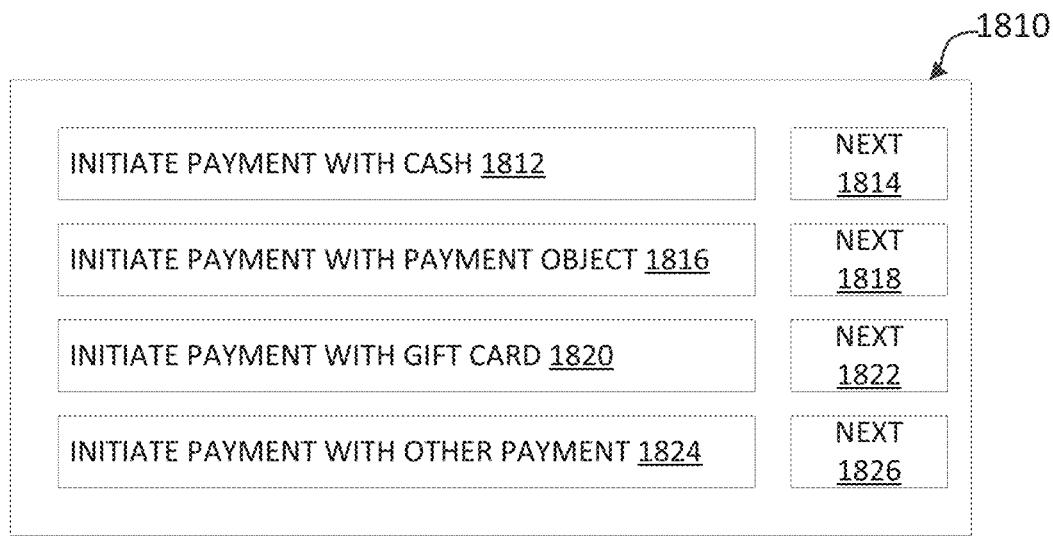
FIGS. 18A and 18B illustrate example views of a user interface (UI) window of a merchant point of sale graphical user interface (GUI) and a customer point of sale GUI, respectively, with the options available to the merchant to complete the item input portion.
Figure 18B:
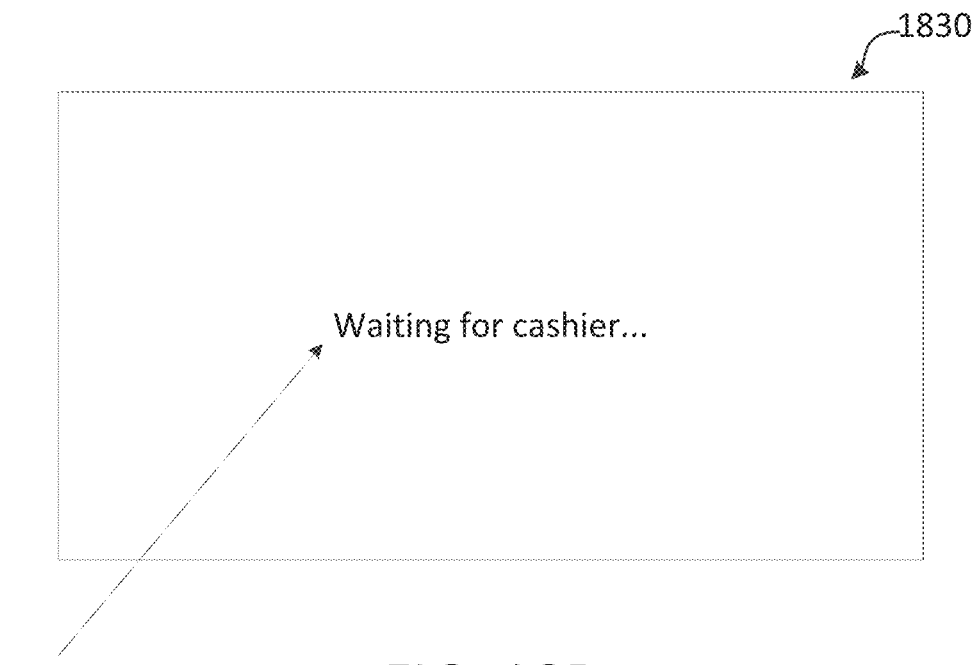

FIGS. 18A and 18B illustrate example views of a user interface (UI) window of a merchant point of sale graphical user interface (GUI) and a customer point of sale GUI, respectively, with the options available to the merchant to complete the item input portion. FIG. 18A illustrates an example view of the UI window 1810 that is displayed on a merchant point of sale interface after completion of the item input portion of a first point of sale transaction (for example, by the merchant selecting "new ticket" 1620 in FIG. 16). The merchant has several options for completing payment of the first point of sale transaction via the UI window. The merchant can select the "initiate payment with cash" user interface button 1812 and then select next 1814 to guide the merchant through a cash transaction. The merchant can select initiate payment with payment object button 1816 and then select "next" 1818 to transfer control of state of the point of sale transaction to the customer terminal. The merchant can select the "initiate payment with gift card" user interface button 1820 and then select next 1822 to guide the merchant through a gift card transaction. The merchant can also select the "initiate payment with other payment" user interface button 1824 and then select next 1826 to be guided through a transaction with another form of payment.

Although not shown, a "cancel transaction" button can also be provided that allows the merchant terminal to request cancellation of the transaction. During this state of the point of sale system, the merchant terminal is the state control terminal and the customer terminal is the non-state control terminal. During this state, the customer terminal waits for a message from the merchant terminal indicating that the customer terminal can initiate the payment portion of the transaction. As shown in FIG. 18B, the customer user interface 1830 can include a text UI feature 1835, which, for example, can display the text "Waiting for cashier . . . " when waiting for cashier to complete the item input portion of the point of sale transaction.

The UI window 1810 can automatically be displayed on the merchant point of sale GUI when the item input portion is complete, or can be displayed in response to a manual input by the merchant or by the customer.

Figure 19A:
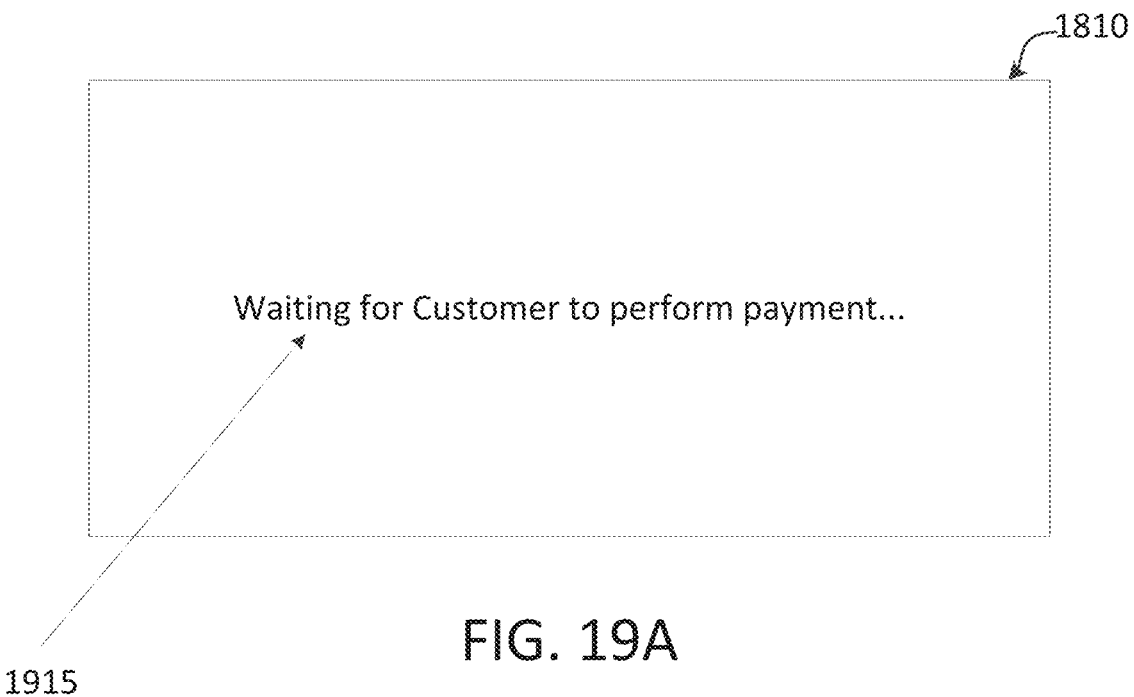
FIGS. 19A and 19B illustrate example views of a UI window on a merchant point of sale GUI and a customer point of sale GUI, respectively, with the control now with the customer terminal.
Figure 19B:
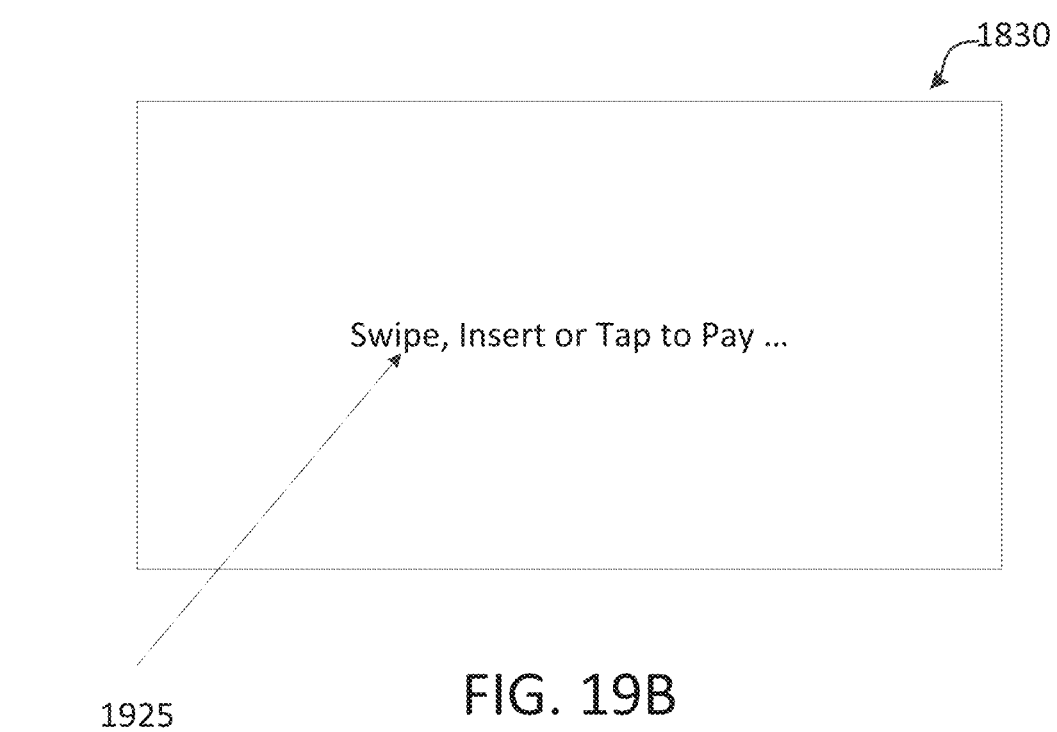

FIGS. 19A and 19B illustrate example views of a UI window on a merchant point of sale GUI and a customer point of sale GUI, respectively, with the control of state of the point of sale system now with the customer terminal. With reference to FIG. 19A, the UI window 1830 now displays a text UI feature 1915. The UI window 1810 can display a merchant-specific version of the screen on the customer interface 1830. In the example views of FIGS. 19A and 19B, the UI feature 1915 displayed is "Waiting for Customer to perform payment . . . " when the UI feature 1925 displayed on the customer point of sale interface 1830 is "Swipe, Insert or Tap to Pay . . . " The UI messages or text UI features displayed on the merchant UI window 1810 and the corresponding customer interface 1830 are highly variable depending upon the point of flow during the point of sale transaction. For example, when the point of flow during the point of sale transaction is waiting for customer input, as shown in FIGS. 19A and 19B, a UI text is displayed on the customer interface 1830 and a coordinated text UI feature is displayed on the merchant UI window of the merchant terminal. Another example of point of flow include the authorization of data from a payment object (i.e. payment card, EMV- or NFC-enabled payment object, etc.) on the customer terminal, during which the customer interface 1830 can display a message that says "Authorizing" and the merchant UI window 1810 can likewise display a similar UI feature indicating "Authorizing" is occurring on the customer terminal. The customer interface 1830 and the coordinated UI window 1810 can display a progress bar, such as a sliding bar of progress, a rotating circle, a pie chart, or another graphical indicator or progress of the transaction. Another example of point of flow includes the approval of the data from the payment object, during which the customer interface 1830 can display a message that says "Approved" and the merchant UI window 1810 can likewise display a similar UI feature indicating "Approval" of the payment on the customer terminal.

Figure 20A:
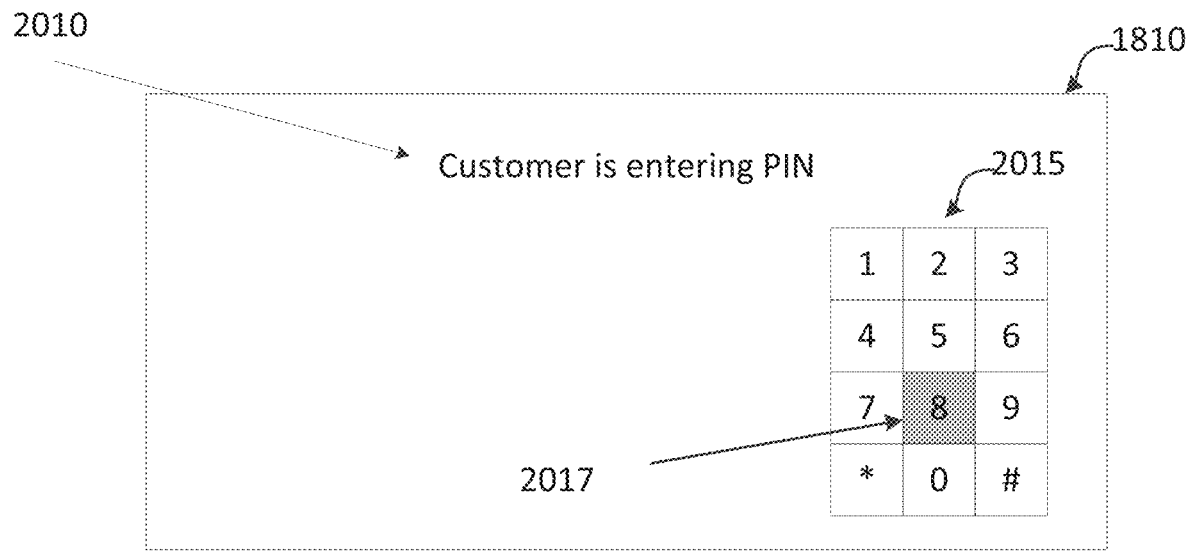
FIGS. 20A and 20B illustrate example views of a UI window of a merchant point of sale GUI and a customer point of sale GUI, respectively, where the customer is entering their PIN on the customer point of sale GUI, and their entries are fully displayed on the merchant UI window.
Figure 20B:
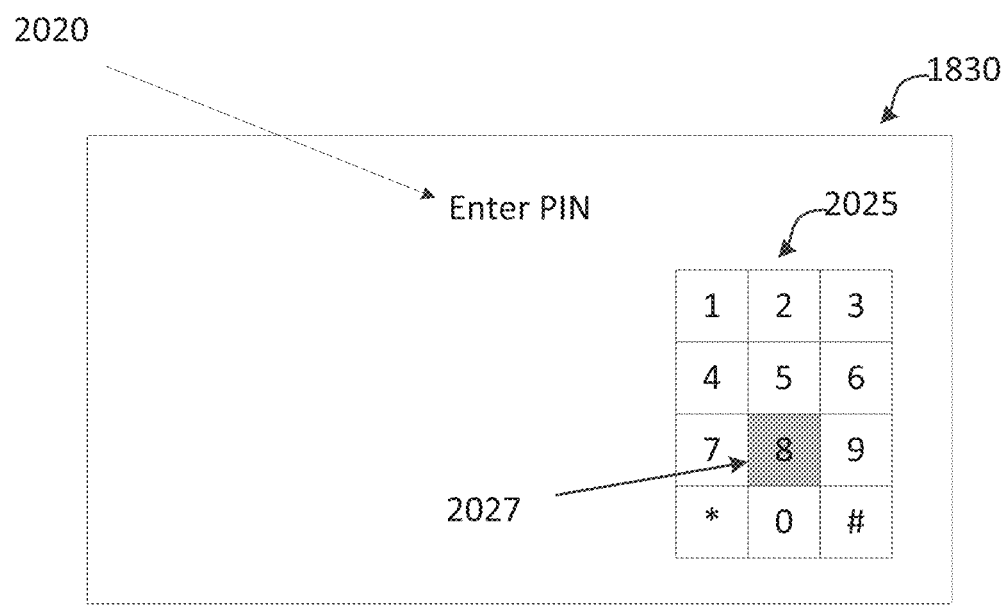

FIGS. 20A and 20B illustrate example views of a UI window 1810 of a merchant point of sale GUI and a customer point of sale GUI 1830, respectively, where the customer is entering their PIN on the customer point of sale GUI, and their entries are fully displayed on the merchant UI window. With reference to FIG. 20A, a UI feature 2010 is displayed as "Customer is entering PIN" on the merchant UI window 1810. The PIN pad window 2015 is also shown on the merchant UI window 1810. The PIN pad window 2015 is a merchant-specific version of the PIN pad 2025 shown in the customer point of sale GUI 1830 of FIG. 20B. The customer is selecting the number "8" on the customer GUI 1830 indicated by the selected UI feature 2027. The customer point of sale GUI 1830 also includes a UI feature 2020 instructing the customer to "Enter PIN." In this embodiment, the PIN entries are shown on the PIN pad window 2015 of the merchant UI window 1810 as they are selected on the customer GUI 1830. This can be accomplished by the customer terminal sending an update message to the merchant terminal after each individual PIN entry. As shown, the selected "8" UI feature 2027 is shown as selected in both the PIN pad window 2025 on the customer GUI 1830, and also on the PIN pad window 2015 by the UI feature 2017 indicating the UI feature 2027 for the number "8" is selected. In some embodiments, an indication of a selection of a PIN number can be displayed or otherwise indicated on the merchant UI window 1810 without indicating the specific number selection.

Figure 21A:
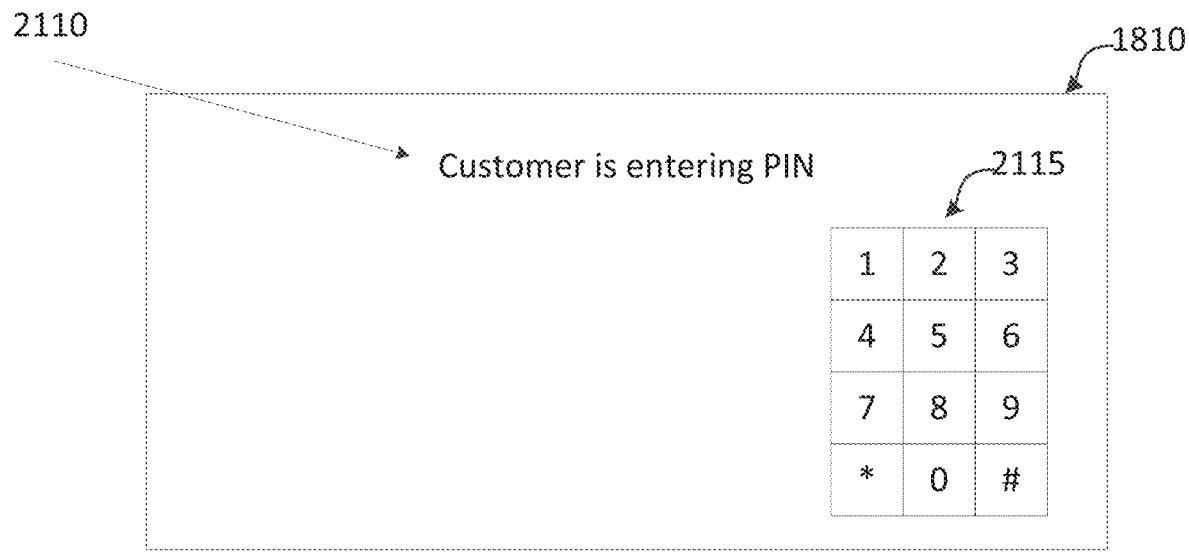
FIGS. 21A and 21B illustrate example views of a UI window on a merchant point of sale GUI and a customer point of sale GUI, respectively, where the customer is entering their PIN on the customer point of sale GUI, and the PIN pad is displayed on the UI window, but the pin entries are not displayed.
Figure 21B:
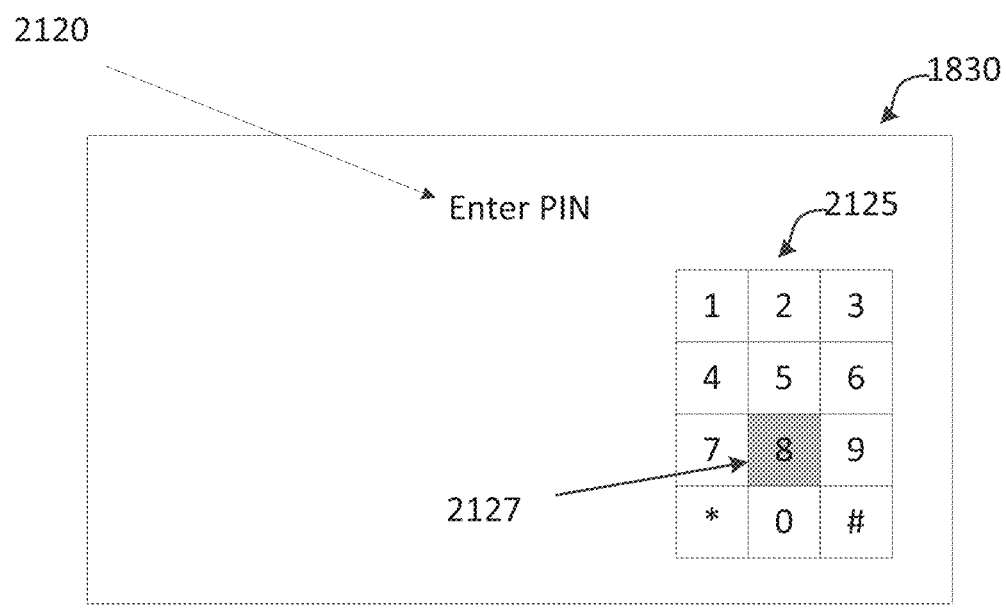

FIGS. 21A and 21B illustrate example views of a UI window on a merchant point of sale GUI and a customer point of sale GUI, respectively, where the customer is entering their PIN on the customer point of sale GUI, and the PIN pad is displayed on the UI window, but the individual pin entries are not displayed. A UI feature 2110 is displayed as "Customer is entering PIN" on the merchant UI window 1810. The PIN pad window 2115 is also shown on the merchant UI window 1810. The customer point of sale GUI 1830 also includes a UI feature 2120 instructing the customer to "Enter PIN." The PIN pad window 2115 is a merchant-specific version of the PIN pad 2125 shown on the customer point of sale GUI 1830 of FIG. 21 B. The customer is selecting the number "8" shown as selected UI feature 2127. In this embodiment, the individual PIN entries entered into the PIN pad window 2125 of the customer GUI 1830 are not displayed on the merchant PIN pad window 2115. In this manner, the confidential PIN entry values entered into the PIN window 2125 on the customer GUI 1830 are not displayed on the merchant UI window. In other embodiment, the PIN window 2115 can be replaced with a black box so that the PIN pad window is not displayed at all on the merchant UI window 1810. An indication, a message, or another communication from the customer terminal to the merchant terminal can indicate that a PIN is being entered and communicate each time a number is entered, without specifying the number that was entered.

Figure 22A:
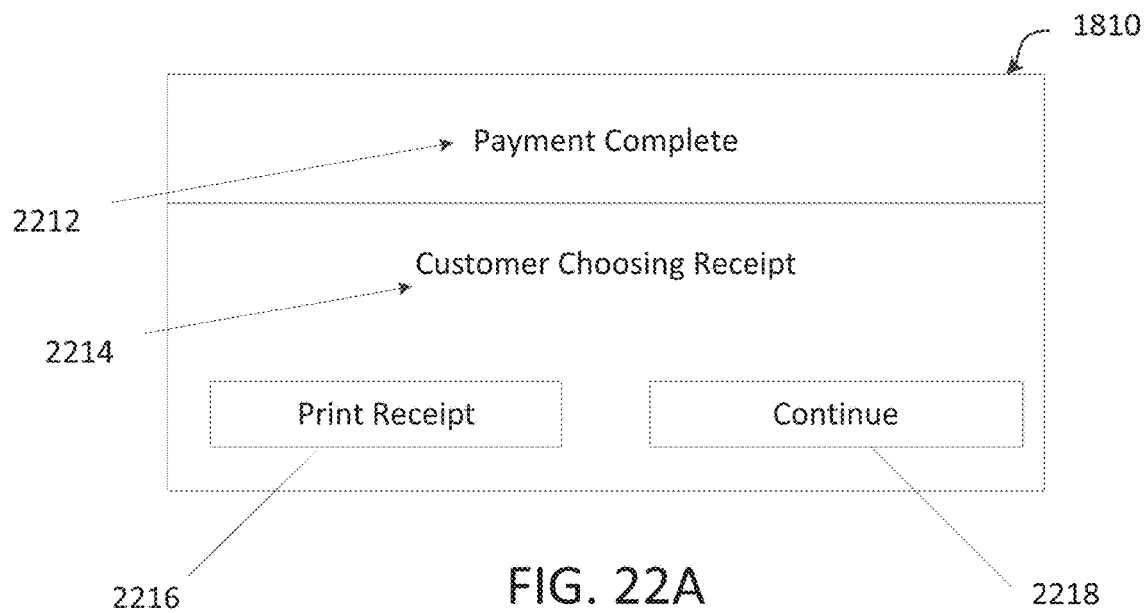
FIGS. 22A and 22B illustrate example views of a UI window of a merchant point of sale GUI and a customer point of sale GUI, respectively, where the customer is choosing the receipt.
Figure 22B:
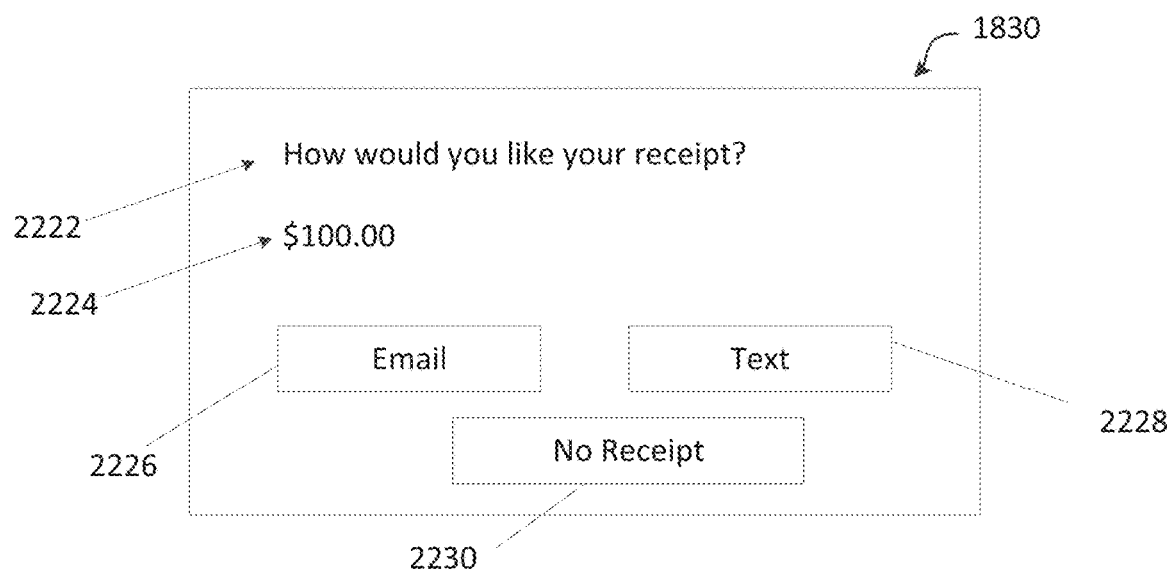

With reference to FIGS. 22A and 22B, once the payment is authorized, the payment is complete and a merchant UI window 1810 can be displayed showing UI features indicating the payment is complete, coordinated to the UI features displayed on the customer interface 1830. Note that the customer terminal can still be the state control terminal here. In some embodiments, control of the point of sale system transitions to the merchant terminal upon completion of the PIN entry, and thus the merchant will be the state control terminal here. FIGS. 22A and 22B illustrate example views of a UI window of a merchant point of sale GUI and a customer point of sale GUI, respectively, where payment is complete and the customer is choosing the receipt. The merchant UI window 1810 can display a UI feature 2212, which for example recites "Payment Complete" to indicate to the merchant that payment is complete on the customer terminal. The merchant UI window 1810 can further display another UI feature 2214, which for example can state "Customer Choosing Receipt" to indicate to the merchant that the customer is choosing a method for receiving their receipt. The merchant also has the option to select the UI button "Print Receipt" 2216 to print a receipt for the customer, for example if the customer is taking a long time or unable to figure out how to print a receipt on the customer device. The merchant also has the option to select the UI button "Continue" 2218 to complete the first point of sale transaction, close the UI window 1810 on the merchant terminal, and proceed with entry of items, or performing other functions, during the point of sale transaction(s). The other functions can include sending items to the kitchen or other location of a merchant business, changing device settings, etc. The customer terminal 1830, upon completion of the payment, can display a UI feature 2222 which recites "How would you like your receipt?" and another UI feature 2224 which recites "$100.00" the total amount charged for the transaction. The customer has the option of selecting the UI button "Email" 2226 to allow the customer to select to Email their receipt, or the user can select the UI button "Text" 2228 to receive the receipt via a text message, such as a SMS (short message service) message, for example via cell phone communication network, the Web or another mobile communication system. The customer can also select the UI button "No Receipt" 2230 if they do not desire to receive a receipt for the transaction.

The UI window 1810 displayed on the merchant terminal can also be used to provide feedback, such as help, or other input to the customer terminal. For example, in FIG. 22B if the customer did not know which button to press, a UI window could be displayed on the customer interface that displays the merchant input. For example, the merchant input can be displayed as an overlay on the customer interface to help the customer to see which button should be pressed, as shown and described with reference to FIGS. 24A and 24B. The merchant input can also be sent in a message to the customer terminal, and received and processed by the customer terminal as though it were received on the customer terminal, as shown and described with reference to FIGS. 23A and 23B. Thus, the merchant terminal and the customer terminal can proceed as though the input on the merchant terminal were received on the customer interface of the customer terminal. For example, the merchant can select to email the receipt and the system continues as though the request were received on the customer terminal. This can occur through one or more messages between the merchant terminal and the customer terminal.

Figure 23A:
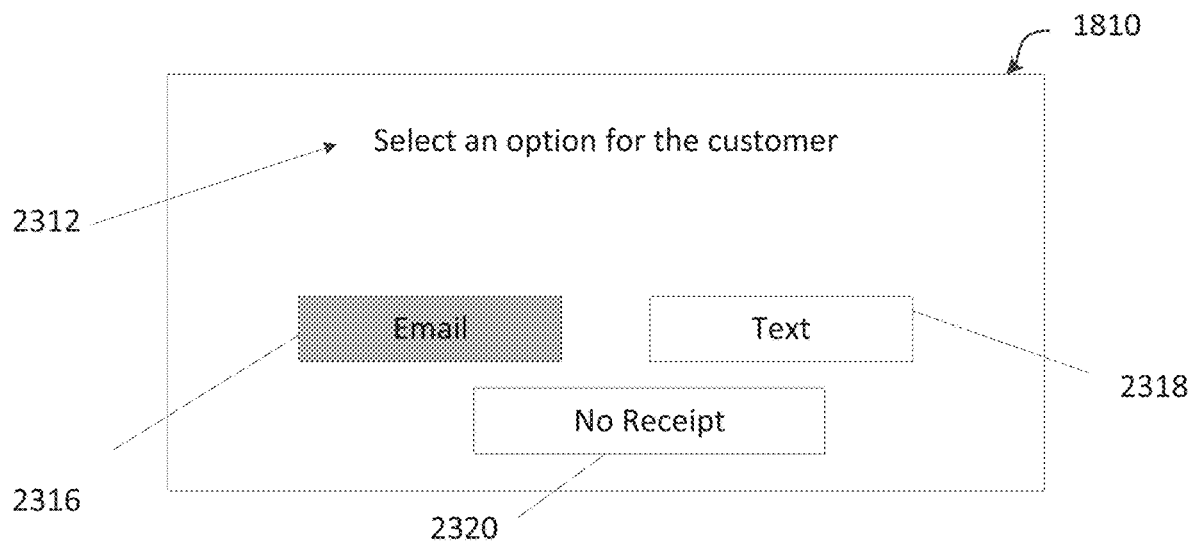
FIGS. 23A and 23B illustrate example views of a UI window of a merchant point of sale GUI and a customer point of sale GUI, respectively, where an entry received in the UI window is interpreted as though it were received on the customer point of sale GUI.
Figure 23B:
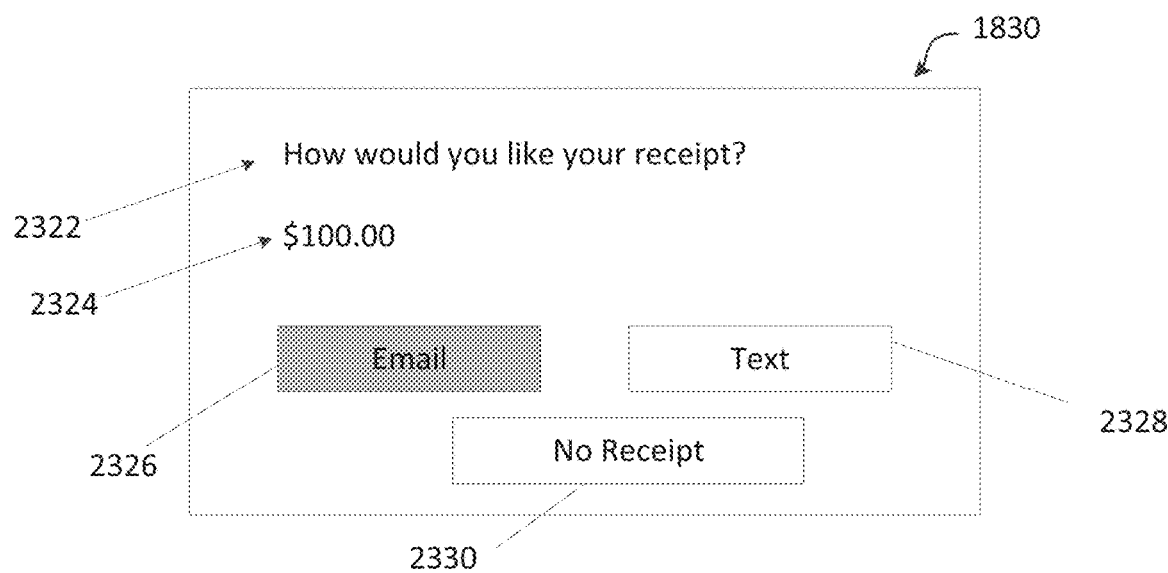

FIGS. 23A and 23B illustrate example views of a UI window of a merchant point of sale GUI and a customer point of sale GUI, respectively, where the merchant is assisting the customer and an entry received in the UI window is interpreted as though it were received on the customer point of sale GUI. The merchant UI window 1810 can display a UI feature 2312 instructing the merchant to "Select an option for the customer." This screen can be displayed on the merchant UI window automatically, for example if a customer has paused at the customer GUI 1830 for a period of time that exceeds a threshold value, for example more than a few seconds. The merchant can then make a selection for the user. The UI window 1810 provides the merchant with the same options that are available to the customer: to select the UI button "Email" 2316, the UI button "Text" 2318 or the UI button "No Receipt" 2320. In this example, the UI button "Email" 2316 is selected by the merchant on the UI window 1810. This is then interpreted by the customer GUI 1830 as an entry received by the customer terminal for example by a message sent from the merchant terminal to the customer terminal. The UI button "Email" 2326 is also shown as selected on the customer GUI 1830. The customer GUI 1830 can also display the UI feature 2322 "how would you like your receipt?" and UI feature 2324 "$100.00" indicating the total amount paid. The customer GUI 1830 also displays a UI button "Text" 2328 and UI button "No Receipt" 2330 showing the receipt options available to the customer. The selection of "Email" by the merchant can be sent in the form of a message from the merchant terminal to the customer terminal, indicating the selection is to be interpreted by the customer terminal as having been received on the customer terminal, and instructing the customer terminal to render the Email UI button as having been selected on the customer terminal.

Figure 24A:
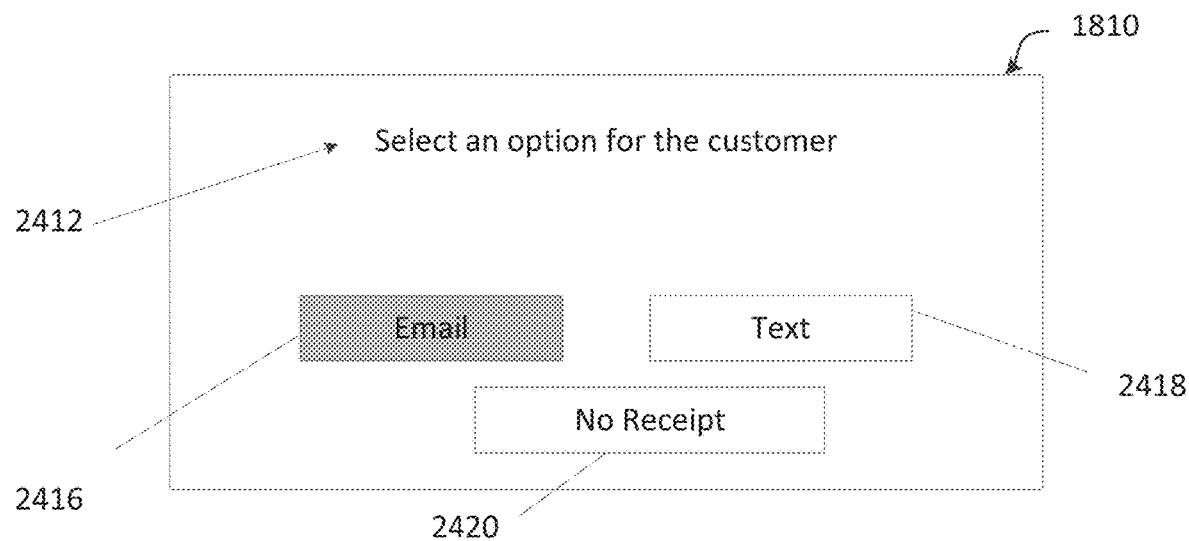
FIGS. 24A and 24B illustrate example views of a UI window of a merchant point of sale GUI and a customer point of sale GUI, respectively, where an entry received in the UI window is displayed as an overlay on the customer point of sale GUI to aid the customer.
Figure 24B:
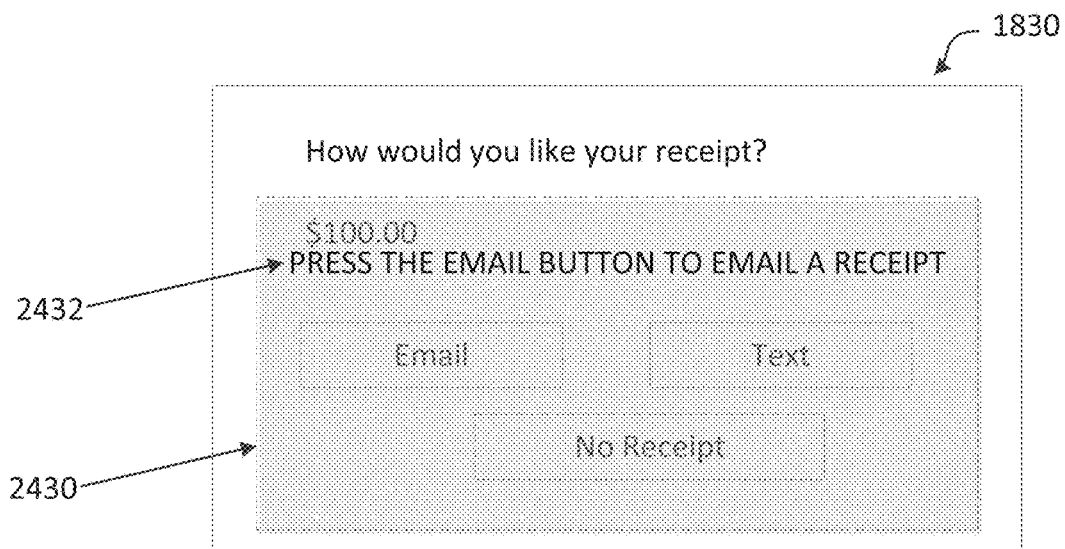

FIGS. 24A and 24B illustrate example views of a UI window of a merchant point of sale GUI and a customer point of sale GUI, respectively, where an entry received in the UI window is displayed as an overlay on the customer point of sale GUI to aid the customer. The merchant UI window 1810 can display a UI feature 2412 instructing the merchant "Select an option for the customer." This can be displayed automatically, for example if the customer is taking too long, or in response to the customer, for example, selecting a "help" button (not shown) displayed on the customer GUI. The merchant can select the UI button "Email" 2416 which is shown as selected on the UI window 1810. The UI window 1810 can also show the UI button "Text" 2418 and UI button "No Receipt" 2420. In this embodiment, when the merchant selects the UI button "Email" 2416, this is sent to the customer terminal as an overlay with instructions to assist the customer in making the proper selection. The UI feature rendered on the customer terminal can be an overlay 2430 including a UI feature 2432 with instructions for the customer, in this example instructing the customer "press the email button to email a receipt."

Figure 25A:
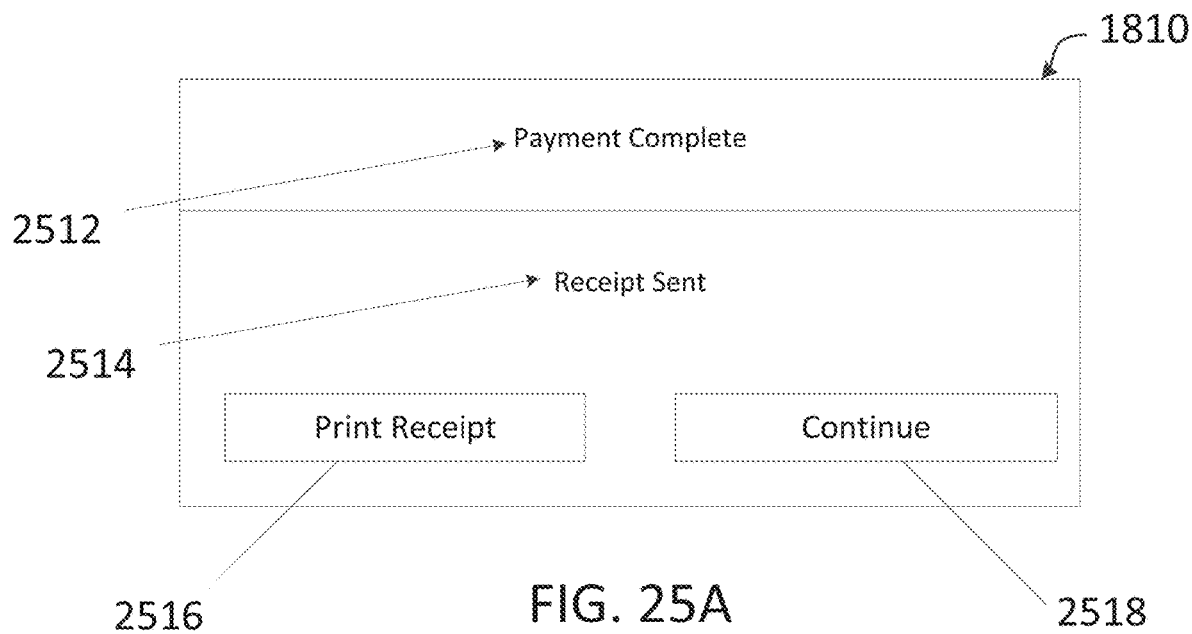
FIGS. 25A and 25B illustrate example views of a UI window of a merchant point of sale GUI and a customer point of sale GUI, respectively, where the customer has completed payment.
Figure 25B:
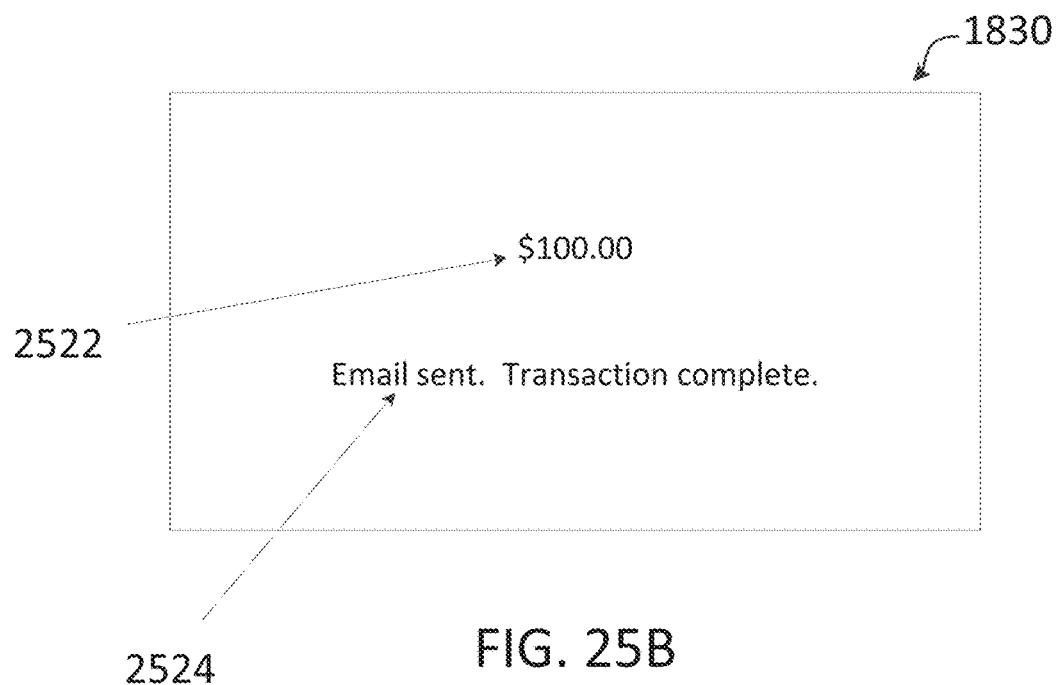

FIGS. 25A and 25B illustrate example views of a UI window of a merchant point of sale GUI and a customer point of sale GUI, respectively, where the customer has completed payment and a receipt has been mailed. The merchant UI window can display a UI feature 2512, which for example recites "Payment Complete" to indicate to the merchant that payment is complete on the customer terminal. The merchant UI window can further display another UI feature 2512, which for example can recite "Receipt Sent" to indicate to the merchant that a receipt has been sent to the customer. The merchant also has the option to select the UI button "Print Receipt" 2516 for a customer that desires to have a physical receipt printed, and the merchant also has the option to select the UI button "Continue" 2518 to complete the first point of sale transaction, close the UI window 1810 on the merchant terminal, and proceed with entry of items, or perform other functions, during the point of sale transaction(s). The customer terminal 1830, upon completion of the payment, can display the UI feature 2522 which recites "$100.00" the total amount charged for the transaction. The customer terminal 1830 also displays the UI feature 2524 which recites "Email Sent. Transaction complete." to indicate to the customer that the receipt has been sent via email.

The control of the system can return to the merchant terminal after the customer completes payment, after a receipt is sent, or after a manual selection by the merchant to continue. Thereafter, the control of the state of the system transitions to the merchant terminal.

Other example UI features and text messages that can be displayed on the customer interface and respective UI window of the merchant terminal include "Authorizing", "Approved", "Insufficient funds", "Split payment" and other terms commonly associated with various stages of a point of sale transaction. The words used, type, placement and display of words are highly variable depending upon the type of the transaction, the stage of the point of sale transaction and the point of sale system.

In some embodiments, the customer can have a set of payment preferences specified such that the receipt is sent automatically in accordance with the payment preferences upon completion of the payment portion of the point of sale transaction on the customer terminal. Accordingly, the customer would effectively by-pass the screen shown in FIG. 22B and be sent directly to the screen shown in FIG. 25B upon approval, or other authorization, of the payment of the point of sale transaction. The customer can specify the set of payment preferences by specifying the preferences with an institution that issued their payment object, such as a bank or financial institution that issued a credit card or a debit card, with the point of sale system through a point of sale system service provider, or with the particular merchant or merchant terminal implementing the point of sale system.

In the instance where the payment object presented at the customer terminal does not have sufficient funds to proceed with the transaction, the customer terminal, as the state control terminal during the payment portion of the point of sale transaction, can cause the customer terminal to display a message indicating insufficient funds, and can cause the customer terminal to send an appropriate message to the merchant terminal indicating insufficient funds for the transaction.

Figure 26:
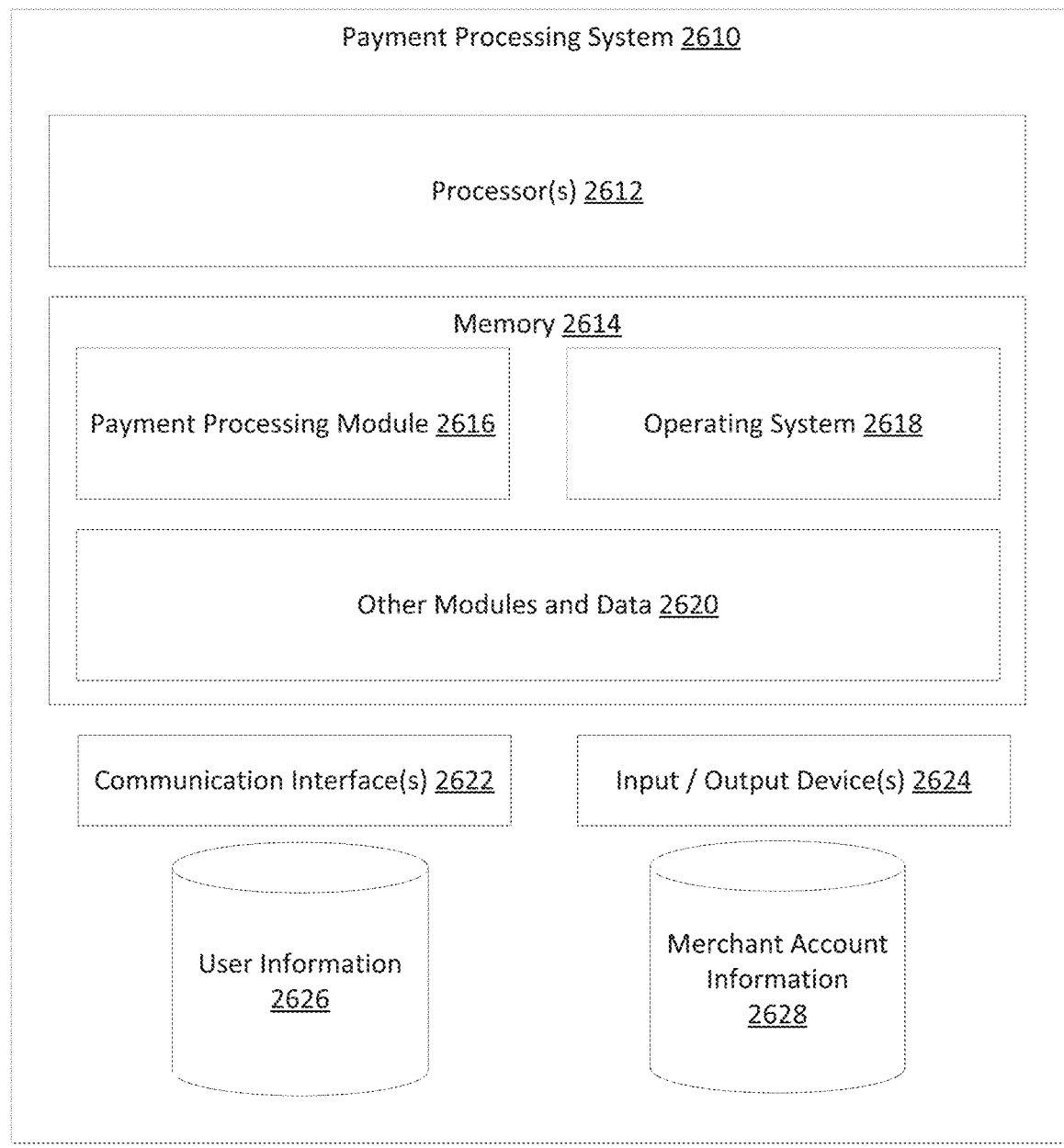
FIG. 26 illustrates an example block diagram of components of a payment processing system.

Reference is now made to FIG. 26, illustrating a block diagram of select components of an example payment processing system 2610 according to some embodiments. The payment processing system 2610 can comprise the payment processing system 102 in an example embodiment. The payment processing system 2610 can be any suitable type of computing device capable of sending communications and performing the functions according to the techniques described herein and can be operated by a service provider that provides the payment processing service. For instance, in the case of a server, the applications, other functional components, and data can be implemented on a single server, a cluster of servers, a server farm or data center, a cloud-hosted computing service, a cloud-hosted storage service, and so forth, although other computer architectures can additionally or alternatively be used.

The payment processing system 2610 enables a service provider to provide a payment service in which merchants are able to conduct POS transactions with a plurality of buyers, such as for selling services and/or products to the buyers. The payment processing system 2610 can include one or more processor(s) 2612 (or servers) that are configured to process secure electronic financial transactions, e.g., payment during a POS transaction, by communicating with the merchant device, card payment networks, and bank or other financial institution payment systems. The payment processing system 2610 includes a payment processing application 2616 that receives transaction information for processing payments made through the merchant application. For example, the payment processing application 2616 can receive transaction information, such as an amount of the transaction, and can verify that a particular payment card can be used to pay for the transaction, such as by contacting a card clearinghouse of a card payment network. Furthermore, in some examples, the payment processing application 2616 can redirect payment information for transactions to be made using payment cards to a bank, or other financial institution, payment system. In other embodiments, the merchant device can communicate directly with an appropriate card payment network or bank payment system for approving or denying a transaction using a particular payment card for a POS transaction.

As used herein, the term "payment card," "payment object," or "payment instrument" refers to a payment mechanism which includes a debit card, a conventional credit card, "smartcards" that have embedded circuits, such integrated circuit (IC) cards (e.g., Europay-MasterCard-Visa (EMV) cards), and NFC enabled payment cards, or any wallet-size card which functions as a combination of any of these payment mechanisms. In some embodiments, a payment card, payment object, or payment instrument can also include a virtual payment card stored on a device such as a smart phone or other device and transmittable, for example, via near field communication (NFC) or other suitable means.

Further, while the examples herein illustrate the components and data of the payment processing system 2610 as being present in a single location, these components and data can alternatively be distributed across different computing devices and different locations. Consequently, the functions can be implemented by one or more computing devices, with the various functionality described above distributed in various ways across the different computing devices, to collectively implement the payment processing system 2610. Multiple payment processing systems 2610 can be located together or separately, and organized, for example, as virtual servers, server banks and/or server farms. The described functionality can be provided by the servers of a single entity or enterprise, or can be provided by the servers and/or services of multiple different buyers or enterprises.

In the example of FIG. 26, the payment processing system 2610 includes one or more processors 2612, one or more memory devices 2614, one or more communication interfaces 2622, and one or more input/output devices 2624. These components can be similar to those described above with reference to FIG. 1 and elsewhere herein.

The memory 2614 can be used to store and maintain any number of functional components or applications that are executable by the processor 2612. In some embodiments, these functional components comprise instructions or programs that are executable by the processor 2612 and that, when executed; implement operational logic for performing the actions and services attributed above to the payment processing system 2610. Functional components of the payment processing system 2610 stored in the memory 2614 can include the payment processing application 2616, the operating system 2618, and other applications and data

2620. These components can be similar to those described with reference to FIG. 1 and elsewhere herein. In addition, the memory 2614 can store data used for performing the operations described herein. Thus, the memory 2614 can store merchant information 2626, including the merchant profiles. Further, the payment processing system 2610 can include many other logical, programmatic and physical components, of which those described above are merely examples that are related to the discussion herein.

For clarity of explanation, in some instances the present technology can be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A point of sale system used in performing point of sale transactions between a customer and a merchant, the point of sale system comprising:
a customer terminal configured to display a customer point of sale interface, the customer point of sale interface configured to display a first series of screens for guiding the customer through a point of sale transaction;
a merchant terminal configured to display a merchant point of sale interface, the merchant point of sale interface configured to display a second series of screens for guiding the merchant through the point of sale transaction, and the merchant point of sale interface configured to display a user interface (UI) window comprising a third series of screens including at least a portion of the first series of screens displayed on the customer terminal so that the merchant is able to view the merchant point of sale interface as well as the at least the portion of the first series of screens displayed on the customer terminal in the UI window on the merchant terminal; and
one or more non-transitory computer readable media storing computer readable instructions, the instructions configured to:
specify a state for the point of sale system, wherein each state corresponds to a screen to display and a plurality of UI features to display for each of the merchant terminal and the customer terminal, each of the merchant terminal and the customer terminal being responsible for rendering an appropriate image in the merchant point of sale interface and the customer point of sale interface on the respective merchant terminal and customer terminal, thereby presentation of both the UI window on the merchant terminal and the UI window on the customer terminal are coordinated on their respective displays,
render the UI window on the merchant terminal for a specified state, the UI window comprising the third series of screens including the at least the portion of the first series of screens displayed on the customer terminal, the third series of screens including a merchant specific UI having at least some of a plurality of UI features displayed on the customer terminal, wherein the at least some of the plurality of UI features correspond to a message indicating a current customer progress through the point of sale transaction, and
cause the customer terminal to send update messages to the merchant terminal that are relevant to the specified state, each update message being descriptive of a customer interaction received in the customer point of sale interface rendered on the customer terminal, and to cause the merchant terminal to render an indication of the customer interaction on the UI window of the merchant terminal.

2. The point of sale system of claim 1, wherein the merchant terminal is further configured to determine which one of the merchant terminal and the customer terminal has control of the state of the point of sale system, and wherein the customer terminal is further configured to determine which one of the merchant terminal and the customer terminal has control of the state of the point of sale system.

3. The point of sale system of claim 1, wherein in a first state for the point of sale system, the merchant terminal is in control of the point of sale transaction while the merchant is performing an item input portion of the point of sale transaction, and in a second state, the customer terminal is in control of the point of sale transaction while the customer is performing an item payment portion of the point of sale transaction.

4. The point of sale system of claim 1 wherein the update message is sent from the customer terminal to the merchant terminal each time the customer interaction is received in the customer point of sale interface rendered on the customer terminal.

5. The point of sale system of claim 1, wherein the instructions are further configured to:
receive a merchant input, from the merchant interacting with one of the UI features in the UI window on the merchant terminal, and
cause the merchant terminal to send an indication to the customer terminal that includes the merchant input.

6. A computer-implemented method for communicating between a merchant terminal and a customer terminal in a point of sale system, the method comprising:
specifying a state for the point of sale system, wherein each state corresponds to a screen to display and a plurality of user interface (UI) features to display for each of the merchant terminal and the customer terminal of the point of sale system, each of the merchant terminal and the customer terminal being responsible for rendering an appropriate image in a merchant point of sale interface and a customer point of sale interface on the respective merchant terminal and customer terminal, thereby presentation of both the merchant terminal and the customer terminal are coordinated interfaces on their respective displays;
rendering a UI window on the merchant terminal for a specified state, the UI window including at least a portion of a customer UI displayed on the customer terminal, the at least the portion of the customer UI comprising a merchant specific UI having at least some of a plurality of UI features displayed on the customer terminal, wherein the at least some of the plurality of UI features correspond to a message indicating a current customer progress through the point of sale transaction;
receiving update messages by the merchant terminal, from the customer terminal, that are relevant to the specified state, each update message being descriptive of a customer interaction received in the customer point of sale interface rendered on the customer terminal; and
causing the merchant terminal to render an indication of the customer interaction on the UI window of the merchant terminal based at least in part on the update messages.

7. The computer-implemented method of claim 6, further comprising:
determining, by the merchant terminal or the customer terminal, which one of the merchant terminal and the customer terminal has control of the state of the point of sale system.

8. The computer-implemented method of claim 7, wherein causing the merchant terminal and the customer terminal to determine which one of the merchant terminal and the customer terminal has control of the state of the point of sale system comprises:
causing the customer terminal and the merchant terminal to determine a status of the point of sale transaction, so that the status of the point of sale transaction determines the state of the point of sale system.

9. The computer-implemented method of claim 7, wherein causing the merchant terminal and the customer terminal to determine which one of the merchant terminal and the customer terminal has control of the state of the point of sale system comprises:
  causing the customer terminal and the merchant terminal to determine a status of the point of sale transaction, where:
  when the status of the point of sale transaction is an item input portion, the state of the point of sale system is the merchant terminal is in control, and
  when the status of the point of sale transaction is a payment input portion, the state of the point of sale system is the customer terminal is in control.

10. The computer-implemented method of claim 6, wherein, when the state is a first state, the merchant terminal is in control of the point of sale transaction, and further comprising:
  receiving an item input portion of the point of sale transaction into the merchant terminal.

11. The computer-implemented method of claim 6, wherein, when the state is a second state, the customer terminal is in control of the point of sale transaction, and further comprising:
  receiving a payment input portion of the point of sale transaction into the customer terminal.

12. The computer-implemented method of claim 11, further comprising:
  upon completion of the payment input portion of the point of sale transaction, transitioning the point of sale system to a third state where the merchant terminal is in control.

13. The computer-implemented method of claim 6, wherein rendering the UI window comprises:
  displaying some of the UI features and not including a PIN (personal identification number) pad entry window that is displayed on the customer terminal.

14. A computing device used as a merchant terminal in a point of sale system, the computing device comprising:
  a processor; and
  one or more non-transitory computer readable media storing computer readable instructions that, when executed by the processor, are configured to cause the computing device to:
    specify a state for the point of sale system, wherein each state corresponds to a screen to display and a plurality of user interface (UI) features to display for the merchant terminal;
    render a UI window on the merchant terminal for a specified state, the UI window including at least a portion of a customer UI displayed on a customer terminal, the at least the portion of the customer UI being a merchant specific UI having at least some of the plurality of UI features displayed on the customer terminal, wherein the at least some of the plurality of UI features correspond to a message indicating a current customer progress through the point of sale transaction; and
    receive update messages from the customer terminal, the update messages being relevant to the specified state, and descriptive of customer interaction received in a customer point of sale interface rendered on the customer terminal, and cause the merchant terminal to render an indication of the customer interaction on the UI window of the merchant terminal based at least in part on the update messages.

15. The computing device of claim 14 wherein the computer readable instructions are further configured to:
  receive a merchant input into the UI window and send the merchant input to the customer terminal.

16. The computing device of claim 15 wherein the computer readable instructions are further configured to:
  send a message to the customer terminal to cause the customer terminal to display a customer UI window as an overlay on the customer point of sale interface.

17. The computing device of claim 16, wherein the message further causes the customer terminal to display the merchant input in the customer UI window overlaid on the customer interface.

18. The computing device of claim 16 wherein the computer readable instructions are further configured to:
  send a message to the customer terminal to proceed as though the merchant input were received on the customer terminal.

19. The computing device of claim 14 wherein the instructions are further configured to:
  cause the merchant terminal to, in response to receiving a message from the customer terminal indicating completion of the customer interaction, gain control of the state of the point of sale transaction.

20. The computing device of claim 14 wherein the computer readable instructions are further configured to:
  receive an item input portion for a second point of sale transaction, at the merchant terminal, while the payment input portion for the first point of sale transaction is received by the customer terminal.

* * * * *